(12) United States Patent
Tanaka et al.

(10) Patent No.: US 12,406,185 B1
(45) Date of Patent: Sep. 2, 2025

(54) SYSTEM AND METHOD FOR PRUNING NEURAL NETWORKS AT INITIALIZATION USING ITERATIVELY CONSERVING SYNAPTIC FLOW

(71) Applicants: NTT Research, Inc., Sunnyvale, CA (US); THE BOARD OF TRUSTEES OF THE LELAND STANFORD JUNIOR UNIVERSITY, Stanford, CA (US)

(72) Inventors: Hidenori Tanaka, Sunnyvale, CA (US); Daniel Kunin, Stanford, CA (US); Daniel L. K. Yamins, Sunnyvale, CA (US); Surya Ganguli, Stanford, CA (US)

(73) Assignees: NTT Research, Inc., Sunnyvale, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 1053 days.

(21) Appl. No.: 17/377,188

(22) Filed: Jul. 15, 2021

Related U.S. Application Data

(60) Provisional application No. 63/052,317, filed on Jul. 15, 2020.

(51) Int. Cl.
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
CPC .................................. G06N 3/082; G06N 3/04
See application file for complete search history.

(56) References Cited

U.S. PATENT DOCUMENTS

| 4,941,176 A | 7/1990 | Matyas et al. |
| 6,575,902 B1 | 6/2003 | Burton |

(Continued)

FOREIGN PATENT DOCUMENTS

| CN | 104618377 A | 5/2015 |
| JP | H11328593 A | 11/1999 |

(Continued)

OTHER PUBLICATIONS

"Pruning neural networks without any data by iteratively conserving synaptic flow" Hidenori Tanaka, Daniel Kunin, Daniel L. K. Yami 34th Conference on Neural Information Processing Systems (NeurIPS 2020), Vancouver, Canada. (Year: 2020).*

(Continued)

*Primary Examiner* — Pei Yong Weng
(74) *Attorney, Agent, or Firm* — DLA Piper LLP US

(57) ABSTRACT

A system and method to prune parameters of a neural network at initialization uses iterative conserving synaptic flow that saves time, memory and energy both during training and at test time of the neural network. The result of the disclosed pruning system and method are highly sparse trainable subnetworks at initialization, without training and without ever looking at the data (a data agnostic pruning system and method). The pruning system and method preserves the total flow of synaptic strengths through the network at initialization subject to a sparsity constraint.

16 Claims, 10 Drawing Sheets

(56) References Cited

U.S. PATENT DOCUMENTS

| | | |
|---|---|---|
| 7,610,624 B1 | 10/2009 | Brothers et al. |
| 7,703,128 B2 | 4/2010 | Cross et al. |
| 7,912,698 B2 | 3/2011 | Statnikov et al. |
| 8,135,718 B1 | 3/2012 | Das et al. |
| 8,418,249 B1 | 4/2013 | Nuycci et al. |
| 8,495,747 B1 | 7/2013 | Nakawatase et al. |
| 8,621,203 B2 | 12/2013 | Ekberg et al. |
| 8,719,924 B1 | 5/2014 | Williamson et al. |
| 8,726,379 B1 | 5/2014 | Stiansen et al. |
| 8,762,298 B1 | 6/2014 | Ranjan et al. |
| 8,806,647 B1 | 8/2014 | Daswani et al. |
| 8,831,228 B1 | 9/2014 | Agrawal et al. |
| 8,892,876 B1 | 11/2014 | Huang et al. |
| 9,144,389 B2 | 9/2015 | Srinivasan et al. |
| 9,183,387 B1 | 11/2015 | Altman et al. |
| 9,258,321 B2 | 2/2016 | Amsler et al. |
| 9,270,689 B1 | 2/2016 | Wang et al. |
| 9,323,928 B2 | 4/2016 | Agarwal et al. |
| 9,356,942 B1 | 5/2016 | Joffe |
| 9,674,880 B1 | 6/2017 | Egner et al. |
| 9,680,855 B2 | 6/2017 | Schultz et al. |
| 9,716,728 B1 | 7/2017 | Tumulak |
| 9,742,778 B2 | 8/2017 | O'Sullivan et al. |
| 9,787,640 B1 | 10/2017 | Xie et al. |
| 10,026,330 B2 | 7/2018 | Burford |
| 10,038,723 B2 | 7/2018 | Gustafsson |
| 10,104,097 B1 | 10/2018 | Yumer et al. |
| 10,140,381 B2 | 11/2018 | Trikha et al. |
| 10,268,820 B2 | 4/2019 | Okano et al. |
| 10,326,744 B1 | 6/2019 | Nossik et al. |
| 10,389,753 B2 | 8/2019 | Kawashima et al. |
| 10,462,159 B2 | 10/2019 | Inoue et al. |
| 10,566,084 B2 | 2/2020 | Kataoka |
| 10,644,878 B2 | 5/2020 | Yamamoto |
| 10,652,270 B1 | 5/2020 | Hu et al. |
| 10,681,080 B1 | 6/2020 | Chen et al. |
| 10,887,324 B2 | 1/2021 | Kataoka et al. |
| 2002/0052858 A1 | 5/2002 | Goldman et al. |
| 2002/0138492 A1 | 9/2002 | Kil |
| 2003/0163684 A1 | 8/2003 | Fransdonk |
| 2003/0163686 A1 | 8/2003 | Ward et al. |
| 2003/0169185 A1 | 9/2003 | Taylor |
| 2003/0188181 A1 | 10/2003 | Kunitz et al. |
| 2004/0015579 A1 | 1/2004 | Cooper et al. |
| 2004/0022390 A1 | 2/2004 | McDonald et al. |
| 2004/0128535 A1 | 7/2004 | Cheng |
| 2004/0158350 A1 | 8/2004 | Ostergaard et al. |
| 2004/0267413 A1 | 12/2004 | Keber |
| 2006/0037080 A1 | 2/2006 | Maloof |
| 2006/0038818 A1 | 2/2006 | Steele |
| 2006/0187060 A1 | 8/2006 | Colby |
| 2006/0187061 A1 | 8/2006 | Colby |
| 2006/0265751 A1 | 11/2006 | Cosquer et al. |
| 2007/0136607 A1 | 6/2007 | Launchbury et al. |
| 2007/0261112 A1 | 11/2007 | Todd et al. |
| 2007/0266433 A1 | 11/2007 | Moore |
| 2008/0098479 A1 | 4/2008 | O'Rourke et al. |
| 2008/0119958 A1 | 5/2008 | Bear et al. |
| 2008/0148398 A1 | 6/2008 | Mezack et al. |
| 2008/0220740 A1 | 9/2008 | Shatzkamer et al. |
| 2008/0244008 A1 | 10/2008 | Wilkinson et al. |
| 2008/0276317 A1 | 11/2008 | Chandola et al. |
| 2008/0279387 A1 | 11/2008 | Gassoway |
| 2008/0294019 A1 | 11/2008 | Tran |
| 2008/0307526 A1 | 12/2008 | Chung et al. |
| 2008/0319591 A1 | 12/2008 | Markiton et al. |
| 2009/0021394 A1 | 1/2009 | Coughlin |
| 2009/0028141 A1 | 1/2009 | Duong et al. |
| 2009/0062623 A1 | 3/2009 | Cohen et al. |
| 2009/0066521 A1 | 3/2009 | Atlas et al. |
| 2009/0067923 A1 | 3/2009 | Whitford |
| 2009/0077666 A1 | 3/2009 | Chen et al. |
| 2009/0157057 A1 | 6/2009 | Ferren et al. |
| 2009/0167531 A1 | 7/2009 | Ferguson |
| 2009/0254973 A1 | 10/2009 | Kwan |
| 2009/0254992 A1 | 10/2009 | Schultz et al. |
| 2009/0287706 A1 | 11/2009 | Bourges-Waldegg et al. |
| 2010/0007489 A1 | 1/2010 | Misra et al. |
| 2010/0066509 A1 | 3/2010 | Okuizumi et al. |
| 2010/0183211 A1 | 7/2010 | Meetz et al. |
| 2010/0201489 A1 | 8/2010 | Griffin |
| 2010/0246827 A1 | 9/2010 | Lauter et al. |
| 2010/0286572 A1 | 11/2010 | Moersdorf et al. |
| 2011/0179492 A1 | 7/2011 | Markopoulou et al. |
| 2011/0291803 A1 | 12/2011 | Bajic et al. |
| 2011/0299420 A1 | 12/2011 | Waggener et al. |
| 2012/0005755 A1 | 1/2012 | Kitazawa et al. |
| 2012/0024889 A1 | 2/2012 | Robertson et al. |
| 2012/0110328 A1 | 5/2012 | Pate et al. |
| 2012/0167210 A1 | 6/2012 | Garcia et al. |
| 2012/0278889 A1 | 11/2012 | El-Moussa |
| 2012/0324568 A1 | 12/2012 | Wyatt et al. |
| 2013/0046696 A1 | 2/2013 | Radhakrishnan |
| 2013/0046987 A1 | 2/2013 | Radhakrishnan |
| 2013/0074186 A1 | 3/2013 | Muttik |
| 2013/0104238 A1 | 4/2013 | Balson et al. |
| 2013/0111036 A1 | 5/2013 | Ozawa et al. |
| 2013/0195326 A1 | 8/2013 | Bear et al. |
| 2013/0247205 A1 | 9/2013 | Schrecker et al. |
| 2013/0298243 A1 | 11/2013 | Kumar et al. |
| 2013/0340084 A1 | 12/2013 | Schrecker et al. |
| 2013/0347094 A1 | 12/2013 | Bettini et al. |
| 2014/0105573 A1 | 4/2014 | Hanckmann et al. |
| 2014/0108474 A1 | 4/2014 | David et al. |
| 2014/0115707 A1 | 4/2014 | Bailey, Jr. |
| 2014/0122370 A1 | 5/2014 | Jamal et al. |
| 2014/0136846 A1 | 5/2014 | Kitze et al. |
| 2014/0137257 A1 | 5/2014 | Martinez et al. |
| 2014/0153478 A1 | 6/2014 | Kazmi et al. |
| 2014/0157405 A1 | 6/2014 | Joll et al. |
| 2014/0163640 A1 | 6/2014 | Edgerton et al. |
| 2014/0181267 A1 | 6/2014 | Watdkins et al. |
| 2014/0181973 A1 | 6/2014 | Lee et al. |
| 2014/0189861 A1 | 7/2014 | Gupta et al. |
| 2014/0189873 A1 | 7/2014 | Elder et al. |
| 2014/0201374 A1 | 7/2014 | Ashwood-Smith et al. |
| 2014/0201836 A1 | 7/2014 | Amsler |
| 2014/0219096 A1 | 8/2014 | Rabie et al. |
| 2014/0222813 A1 | 8/2014 | Yang et al. |
| 2014/0229739 A1 | 8/2014 | Roth et al. |
| 2014/0237599 A1 | 8/2014 | Gertner et al. |
| 2014/0259170 A1 | 9/2014 | Amsler |
| 2014/0317261 A1 | 10/2014 | Shatzkamer et al. |
| 2014/0317293 A1 | 10/2014 | Shatzkamer |
| 2014/0325231 A1 | 10/2014 | Hook et al. |
| 2014/0343967 A1 | 11/2014 | Baker |
| 2015/0019710 A1 | 1/2015 | Shaashua et al. |
| 2015/0033340 A1 | 1/2015 | Giokas |
| 2015/0061867 A1 | 3/2015 | Engelhard et al. |
| 2015/0074807 A1 | 3/2015 | Turbin |
| 2015/0082308 A1 | 3/2015 | Kiess et al. |
| 2015/0088791 A1 | 3/2015 | Lin et al. |
| 2015/0096024 A1 | 4/2015 | Haq et al. |
| 2015/0163242 A1 | 6/2015 | Laidlaw et al. |
| 2015/0178469 A1 | 6/2015 | Park et al. |
| 2015/0227964 A1 | 8/2015 | Yan et al. |
| 2015/0283036 A1 | 10/2015 | Aggarwal et al. |
| 2015/0288541 A1 | 10/2015 | Farango et al. |
| 2015/0288767 A1 | 10/2015 | Fargano et al. |
| 2015/0317169 A1 | 11/2015 | Sinha et al. |
| 2015/0326535 A1 | 11/2015 | Rao et al. |
| 2015/0326587 A1 | 11/2015 | Vissamsetty et al. |
| 2015/0326588 A1 | 11/2015 | Vissamsetty et al. |
| 2015/0333979 A1 | 11/2015 | Schwengler et al. |
| 2015/0356451 A1 | 12/2015 | Gupta et al. |
| 2015/0381423 A1 | 12/2015 | Xiang |
| 2015/0381649 A1 | 12/2015 | Schultz et al. |
| 2016/0006642 A1 | 1/2016 | Chang et al. |
| 2016/0014147 A1 | 1/2016 | Zoldi et al. |
| 2016/0050161 A1 | 2/2016 | Da et al. |
| 2016/0057234 A1 | 2/2016 | Parikh et al. |
| 2016/0065596 A1 | 3/2016 | Baliga et al. |
| 2016/0154960 A1 | 6/2016 | Sharma et al. |
| 2016/0156644 A1 | 6/2016 | Wang et al. |

(56) References Cited

U.S. PATENT DOCUMENTS

| | | | |
|---|---|---|---|
| 2016/0156656 A1 | 6/2016 | Boggs et al. | |
| 2016/0182379 A1 | 6/2016 | Mehra et al. | |
| 2016/0205106 A1 | 7/2016 | Yacoub et al. | |
| 2016/0218875 A1 | 7/2016 | Le Saint et al. | |
| 2016/0241660 A1 | 8/2016 | Nhu | |
| 2016/0248805 A1 | 8/2016 | Burns et al. | |
| 2016/0301704 A1 | 10/2016 | Hassanzadeh et al. | |
| 2016/0301709 A1 | 10/2016 | Hassanzadeh et al. | |
| 2016/0344587 A1 | 11/2016 | Hoffmann | |
| 2016/0350539 A1 | 12/2016 | Oberheide et al. | |
| 2016/0350846 A1 | 12/2016 | Dintenfass et al. | |
| 2016/0352732 A1 | 12/2016 | Bamasag et al. | |
| 2016/0364553 A1 | 12/2016 | Smith et al. | |
| 2017/0063893 A1 | 3/2017 | Franc et al. | |
| 2017/0093915 A1 | 3/2017 | Ellis et al. | |
| 2017/0149804 A1 | 5/2017 | Kolbitsch et al. | |
| 2017/0228651 A1 | 8/2017 | Yamamoto | |
| 2017/0264597 A1 | 9/2017 | Pizot et al. | |
| 2017/0310485 A1 | 10/2017 | Robbins et al. | |
| 2017/0318033 A1 | 11/2017 | Holland et al. | |
| 2017/0366571 A1 | 12/2017 | Boyer | |
| 2017/0373835 A1 | 12/2017 | Yamamoto | |
| 2017/0374084 A1 | 12/2017 | Inoue et al. | |
| 2018/0078213 A1 | 3/2018 | Kataoka et al. | |
| 2018/0078452 A1 | 3/2018 | Kataoka et al. | |
| 2018/0083988 A1 | 3/2018 | Kataoka et al. | |
| 2018/0212768 A1 | 7/2018 | Kawashima et al. | |
| 2018/0212941 A1 | 7/2018 | Yamamoto et al. | |
| 2018/0337958 A1 | 11/2018 | Nagarkar | |
| 2019/0052652 A1 | 2/2019 | Takahashi et al. | |
| 2019/0075455 A1 | 3/2019 | Coulier | |
| 2019/0156934 A1 | 5/2019 | Kataoka | |
| 2019/0228274 A1* | 7/2019 | Georgiadis | G06N 3/082 |
| 2019/0370384 A1 | 12/2019 | Dalek et al. | |
| 2020/0177613 A1 | 6/2020 | Nilangekar et al. | |

FOREIGN PATENT DOCUMENTS

| | | |
|---|---|---|
| JP | 2000000232 A | 1/2000 |
| JP | 2005217808 A | 8/2005 |
| JP | 2008167979 A | 7/2008 |
| JP | 2009075695 A | 4/2009 |
| JP | 2011060288 A | 3/2011 |
| JP | 2011095824 A | 5/2011 |
| JP | 2014515538 A | 6/2014 |
| JP | 2015012492 A | 1/2015 |
| JP | WO2015190446 A1 | 4/2017 |
| JP | 2008049602 A | 3/2018 |
| JP | 2018148267 A | 9/2018 |
| KR | 1020080046779 A | 5/2008 |
| WO | WO2008117544 A1 | 10/2008 |
| WO | WO2010103800 A | 9/2010 |

OTHER PUBLICATIONS

Thornton et al., "Auto-WEKA webpage printed regarding algorithm," Feb. 17, 2015, 2 pages.
Ayat, N.E .; Cheriet, M.; Suen, C.Y.; "Automatic Model Selection for the optimization of SVM Kernels," Mar. 21, 2005, 35 pages.
Brodley, Carla E., "Addressing the Selective Superiority Problem: Automatic Algorithm/Model Class Selection," (1993) (8 pages).
Chapelle, Olivier; Vapnik, Vladimir; Bousquet, Olivier; Mukherjee, Sayan; "Choosing Multiple Parameters for Support Vector Machines," Machine Learning, 46, 131-159, 2002 © 2002 Kluwer Academic Publishers (29 pages).
Lee, Jen-Hao and Lin, Chih-Jen, "Automatic Model Selection for Support Vector Machines," (2000), 16 pages.
Smith, Michael R.; Mitchell, Logan; Giraud-Carrier, Christophe; Martinez, Tony; "Recommending Learning Algorithms and Their Associated Hyperparameters," Jul. 7, 2014 (2 pages).
Thornton, Chris. Thesis: "Auto-WEKA: Combined Selection and Hyperparameter Optimization of Supervised Maching Learning Algorithms," Submitted to the University of British Columbia, Mar. 2014 (75 pages).
Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).
Wolinski, Christophe; Kuchcinski, Krzysztof. "Automatic Selection of Application—Specific Reconfigurable Processor Extensions." Design, Automation & Test in Europe Conference (Date '08), Mar. 2008, Munich, Germany, pp. 1214-1219 (7 pages).
Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).
H. Larochelle et al. "An empirical evaluation of deep architectures on problems with many factors of variation" ACM ICML '07, pp. 473-480, (8 pages).
J. Bergstra et al. "Random Search for Hyper-Parameter Optimization" Journal of Machine Learning Research 13 (2012), pp. 281-305 (25 pages).
Wikipedia—anonymous, 5 pages. https://en.wikipedia.org/wiki/Decision_tree.
Wikipedia—anonymous, 16 pages. en.wikipedia.org/wiki/Support_vector_machine.
Wikipedia—anonymous, 11 pages. en.wikipedia.org/wiki/K-nearest_neighbors_algorithm.
Wikipedia—anonymous, 8 pages. en.wikipedia.org/wiki/Gradient_boosting.
Wikipedia—anonymous, 10 pages. en.wikipedia.org/wiki/Naive_Bayes_classifier.
Wikipedia—anonymous, 3 pages. en.wikipedia.org/wiki/Bootstrap_aggregating.
Wikipedia—anonymous, 14 pages. en.wikipedia.org/wiki/Logistic_regression.
Wikipedia—anonymous, 12 pages. en.wikipedia.org/wiki/AdaBoost.
KAGGLE, 2 pages. https://www.kaggle.com/wiki/Home.
Wikipedia—anonymous—TLS: Transport Layer Security Protocol, (35 pages)—Webpage https://en.wikipedia.org/wiki/Transport_Layer_security.
NIST—National Institute of Standards and Technology, US Department of Commerce "Computer Security Resource Center" AES Algorithm With Galois Counter Mode of Operation, (3 pgs.)—Webpage https:/csrc.nist gov/projects/block-cipher-techniques/bcm.
Moriarty, et al. PKI Certificate—PKCS #12: Personal Information Exchange Syntax v1.1 (30 pgs.)—Webpage https://tools.ietf.org/html/rfc7292.
ITU—International Telecommunication Union—Open Systems Interconnection—X.509: Information Technology—Public-key and attribute framework certificate, (2 pgs.)—Webpage http://www.itu.int/rec/T-REC-X.509/enn.
Groves, M., Sakai-Kasahara Key Encryption (SAKKE)—Internet Engineering Task Force dated Feb. 2012, (22 pgs.)—Webpage https://tools.ietf.org/html/rfc6508.
Barbosa, L. et al.—SK-KEM: An Identity-Based Kem, Algorithm standardized in IEEE (20 pgs.)—Webpage http://grouper.jeee.org/groups/1363/IBC/submissions/Barbosa-SK-KEM-2006-06.pdf.
Boyen-X, et al.—Identity-Based Cryptography Standard (IBCS) #1: Supersingular Curve Implementations of the BF and BB1 Cryptosystems, dated Dec. 2007, (64 pgs.)—Webpage https://tools.ietf.org/html/rfc5091.
"Website Traffic, Statistics and Analytics @ Alexa," an Amazon. com company, 5 pages—Webpage: https://www.alexa.com/siteinfo.
Stouffer, K. et al.—"The National Institute of Standards & Technology (NIST) Industrial Control System (ICS) security guide" dated May 2015 (247 pgs.).
Chih-Fong et al., Intrusion Detection by Machine Learning: A Review: dated 2009; pp. 11994-12000 (7 pages).
Soldo, Fabio, Anh Le, and Athina Markopoulou. "Predictive blacklisting as an implicit recommendation system." INFOCOM, 2010 Proceedings IEEE. IEEE, 2010. (Year: 2010), 9 pages.
Kataoka et al., "Mining Muscle Use Data for Fatigue Reduction in IndyCar", MIT Sloan Sports Analytics Conference. Mar. 4, 2017

(56) References Cited

OTHER PUBLICATIONS

[retrieved Oct. 9, 2018]. Retrieved from the Internet, entire document http://www.sloansportsconference.com/wp-content/uploads/2017/02/1622.pdf.

Kegelman et al., "Insights into vehicle trajectories at the handling limits: analyzing open data from race car drivers; Taylor & Francis, Vehicle System Dynamics" dated Nov. 3, 2016 (18 pgs.).

Theodosis et al., "Nonlinear Optimization of a Racing Line for an Autonomous Racecar Using Professional Driving Techniques", dated Oct. 2012, 7 pages, Citation and abstract, retrieved from the web at: https://www.researchgate.net/publication/267650184.

Tulabandhula et al., "Tire Changes, Fresh Air, and Yellow Flags: Challenges in Predictive Analytics for Professional Racing" MIT, dated Jun. 2014 (16 pages.).

Takagahara et al., "hitoe"—A Wearable Sensor Developed through Cross-industrial Collaboration, NTT Technical Review, dated Sep. 4, 2014 (5 pages.).

Lee et al., "Development of a Novel Tympanic Temperature Monitoring System for GT Car Racing Athletes," World Congress on Medical Physics and Biomedical Engineering, May 26-31, 2012, Beijing, China, Abstract Only, pp. 2062-2065, dated 2013, (3 pages.)—retrieved from the web at: https://link.springer.com/chapter/10.1007/-3-642-29305-4_541.

NTT Innovation Institute, Inc., Global Cyber Threat Intelligence by Kenji Takahashi, Aug. 16, 2016, retrieved on Aug. 16, 2017, 25 pages, retrieved from the Internet, entire document https://www.slideshare.net/ntti3/global-cyber-threat-intelligence.

How to handle Imbalanced Classification Problems in machine learning? In: Analytics Vidhya. Mar. 17, 2017 (Mar. 17, 2017). Retrieved on Aug. 2, 2019 (Aug. 2, 2019), entire document, 46 pages. https://www.analyticsvidhva.com/blog/2017/03/imbalanced-classification-problem/.

Yen et al., "Cluster-based under-sampling approaches for imbalanced data distributions." In: Expert Systems with Applications. Apr. 2009 (Apr. 2009). Retrieved on Aug. 2, 2019 (Aug. 2, 2019), entire document), 10 pages. http://citeseemist.psu.edu/viewdoc/download?doi=10.1.1.454.35308.rep=rep 1 &type=pdf.

Chawla et al., "SMOTE: synthetic minority over-sampling technique." In: Journal of artificial intelligence research. Jun. 2, 2002 (Jun. 2, 2002) Retrieved on Aug. 2, 2019 (Aug. 2, 2019), entire document), 37 pages. https://www.jairorg/index.php/jaidarticle/download/10302J24590.

Malik et al. "Automatic training data cleaning for text classification." In: 2011 IEEE 11th international conference on data mining workshops. Dec. 11, 2011 (Dec. 11, 2011) Retrieved on Aug. 2, 2019 (Aug. 2, 2019), entire document, 8 pages. http://wwwl.cs.columbia.edu/-hhm2104/papers/atdc.pdf.

Moshou et al., "Dynamic muscle fatigue detection using self-organizing maps", Applied Soft Computing, Elsevier, Amsterdam, NL, vol. 5, No. 4, Jul. 1, 2005 (Jul. 1, 2005), pp. 391-398, 8 pages, XP027669999, ISSN: 1568-4946 [retrieved on Jul. 1, 2005].

Zhang et al., "Automated Detection of Driver Fatigue Based on Entropy and Complexity Measures", IEEE Transactions on Intelligent Transportation Systems, IEEE, Piscataway, NJ, USA, vol. 15, No. 1, Feb. 1, 2014 (Feb. 1, 2014), pp. 168-177, XP011538702, ISSN: 1524-9050, DOI: 10.1109/TITS.2013.2275192 [retrieved on Jan. 30, 2014].

Kiwamori e al., "Getting Started with the Cloud: Machine Learning a comfortable experience with Azure ML", [Stamped: Received on May 26, 2016, by the Software Information Center] RIC Telecom, 26 pages.

Mozer et al., "Skeletonization: A Technique for Trimming the Fat from a Network via Relevance Assessment", NIPS'88: Proceedings of the 1st International Conference on Neural Information Processing Systems, published Jan. 1988, pp. 107-115 (9 pages).

Cun et al., "Optimal Brain Damage". AT&T Bell Laboratories, Holmdel, N. J. 07733. Abstract. 8 pages.

Hassibi et al., "Second order derivatives for network pruning: Optimal Brain Surgeon", Department of Electrical Engineering, Stanford University, Stanford, CA 94305, 8 pages.

Reed et al., "Pruning Algorithms—A Survey", IEEE Transactions of Neural Networks, vol. 4, No. 5, Sep. 1993, 8 pages.

Steven A. Janowsky, "Pruning versus clipping in neural networks", Department of Physics, Harvard University, Cambridge, Massachusetts 02138 (Received Nov. 30, 1988), 4 pages.

Han et al., "Learning both Weights and Connections for Efficient Neural Networks", Stanford University, 9 pages.

Sze et al., "Efficient Processing of Deep Neural Networks a Tutorial and Survey", IEEE, Aug. 13, 2017, 32 pages.

Arora et al., "Stronger Generalization Bounds for Deep Nets via Compression Approach", Proceedings of the 35th Internationals Conference on Machine Learning, Stockholm, Sweden, PMLR 80, 2018, 10 pages.

Tanaka et al., "From deep learning to mechanistic understanding neuroscience: the structure of retinal prediction", 33rd Conference on Neural Information Processing Systems (NeurIPS 2019), Vancouver, Canada, 11 pages.

Frankle et al., "The Lottery Ticket Hypothesis: Finding Sparse, Trainable Neural Networks", Published as conference paper at ICLR 2019, MIT CSAIL, 42 pages.

Frankle et al., "Stabilizing Lottery Ticket Hypothesis", MIT CSAIL, University of Cambridge Element AI and University of Toronto Vector Institute, Jul. 20, 2020, 13 pages.

Morcos et al., "One ticket to win them all: generalizing lottery ticket initialization across datasets and optimizers", Facebook AI Research, 33rd Conference on Neural Information Processing Systems (NeurIPS 2019), Vancouver, Canada, 11 pages.

Lee et al., "Snip: Single-Shot Network Pruning Based on Connection Sensitivity", University of Oxford, Published as a conference paper at ICLR 2019, 15 pages.

Wang et al., "Picking Winning Tickets Before Training By Preserving Gradient Flow", Published as a conference paper at ICLR 2020, University of Toronto, Vector Institute, 11 pages.

Iandola et al., "Squeezenet: Alexnet-Level Accuracy With 50X Fewer Parameters and <0.5MB Model Size", Under review as a conference paper at ICLR 2017, DeepScale* & UC Berkeley Stanford University, 13 pages.

Howard et al., "MobileNets: Efficient Convolutional Neural Networks for Mobile Vision Applications", Google Inc., Apr. 17, 2017, 9 pages.

Prabhu et al., "Deep Expander Networks: Efficient Deep Networks from Graph Theory", Center for Visual Information Technology, Kohli Center on Intelligent Systems, IIIT Hyderabad, India, 16 pages.

Jaderberg et al., "Speeding up Convolutional Neural Networks with Low Rank Expansions", Department of Engineering Science University of Oxford, Oxford, UK, 13 pages.

Novikov et al., "Tensorizing Neural Networks", INRIA, SIERRA project-team, Paris, France; Skolkovo Institute of Science and Technology, National Research University Higher School of Economics, 4Institute of Numerical Mathematics of the Russian Academy of Sciences, Moscow, Russia, 9 pages.

Bellec et al., "Deep Rewiring: Training Very Sparse Deep NetWorks", Published as a conference paper at ICLR 2018, Institute for Theoretical Computer Science, Graz University of Technology, Austria, 24 pages.

Mocanu et al., "Scalable training of artificial neural networks with adaptive sparse connectivity inspired by network science", Nature Communications, 2018, 12 pages.

Gale et al., "The State of Sparsity in Deep Neural Networks", This work was completed as part of the Google AI Residency Google Brain and DeepMind, Feb. 25, 2019, 15 pages.

Blalock et al., "What is the State of Neural Network Pruning?", MIT CSAIL, Cambridge, MA, USA. Proceedings of the 3rd MLSys Conference, Austin, TX, USA, 2020, Mar. 6, 2020, 18 pages.

Sejun Park*, Jaeho Lee*, Sangwoo Mo, and Jinwoo Shin. Lookahead: A far-sighted alternative of magnitude-based pruning. In International Conference on Learning Representations, 2020, 20 pages.

Ehud D Karnin. A simple procedure for pruning back-propagation trained neural networks. IEEE transactions on neural networks, 1(2):239-242, 1990, 4 pages.

(56) References Cited

OTHER PUBLICATIONS

Pavlo Molchanov, Stephen Tyree, Tero Karras, Timo Aila, and Jan Kautz. Pruning convolutional neural networks for resource efficient inference. arXiv preprint arXiv:1611.06440, 2016, 17 pages.

Pavlo Molchanov, Arun Mallya, Stephen Tyree, Iuri Frosio, and Jan Kautz. Importance estimation for neural network pruning. In Proceedings of the IEEE Conference on Computer Vision and Pattern Recognition, pp. 11264-11272, 2019, 9 pages.

Yiwen Guo, Anbang Yao, and Yurong Chen. Dynamic network surgery for efficient DNNs. In Advances in neural information processing systems, pp. 1379-1387, 2016, 9 pages.

Xin Dong, Shangyu Chen, and Sinno Pan. Learning to prune deep neural networks via layer-wise optimal brain surgeon. In Advances in Neural Information Processing Systems, pp. 4857-4867, 2017, 11 pages.

Ruichi Yu, Ang Li, Chun-Fu Chen, Jui-Hsin Lai, Vlad I Morariu, Xintong Han, Mingfei Gao, Ching-Yung Lin, and Larry S Davis. Nisp: Pruning networks using neuron importance score propagation. InProceedings of the IEEE Conference on Computer Vision and Pattern Recognition, pp. 9194-9203,2018, 10 pages.

Zhuang Liu, Mingjie Sun, Tinghui Zhou, Gao Huang, and Trevor Darrell. Rethinking the value of network pruning. In International Conference on Learning Representations, 2019, 21 pages.

Namhoon Lee, Thalaiyasingam Ajanthan, Stephen Gould, and Philip H. S. Torr. A signal propagation perspective for pruning neural networks at initialization. In International Conference on Learning Representations, 2020, 16 pages.

Wenyuan Zeng and Raquel Urtasun. Mlprune: Multi-layer pruning for automated neural network compression. 2018, 12 pages.

Hesham Mostafa and Xin Wang. Parameter efficient training of deep convolutional neural networks by dynamic sparse reparameterization. In Proceedings of the 36th International Conference on Machine Learning, vol. 97 of Proceedings of Machine Learning Research, pp. 4646-4655. PMLR, 2019, 10 pages.

Xavier Glorot and Yoshua Bengio. Understanding the difficulty of training deep feedforward neural networks. In Proceedings of the thirteenth international conference on artificial intelligence and statistics, pp. 249-256, 2010, 8 pages.

Kaiming He, Xiangyu Zhang, Shaoqing Ren, and Jian Sun. Deep residual learning for image recognition. In Proceedings of the IEEE conference on computer vision and pattern recognition, pp. 770-778, 2016, 9 pages.

Kedar Dhamdhere, Mukund Sundararajan, and Qiqi Yan. How important is a neuron. In International Conference on Learning Representations, 2019, 15 pages.

Sebastian Bach, Alexander Binder, Grégoire Montavon, Frederick Klauschen, Klaus-Robert Müller, and Wojciech Samek. On pixel-wise explanations for non-linear classifier decisions by layer-wise relevance propagation. PLoS one, 10(7), 2015, 46 pages.

Seul-Ki Yeom, Philipp Seegerer, Sebastian Lapuschkin, Simon Wiedemann, Klaus-Robert Müller, and Wojciech Samek. Pruning by explaining: A novel criterion for deep neural network pruning. arXiv preprint arXiv:1912.08881, 2019, 14 pages.

Hattie Zhou, Janice Lan, Rosanne Liu, and Jason Yosinski. Deconstructing lottery tickets: Zeros, signs, and the supermask. In Advances in Neural Information Processing Systems, pp. 3592-3602, 2019, 11 pages.

Haoran You, Chaojian Li, Pengfei Xu, Yonggan Fu, Yue Wang, Xiaohan Chen, Richard G. Baraniuk, Zhangyang Wang, and Yingyan Lin. Drawing early-bird tickets: Toward more efficient training of deep networks. In International Conference on Learning Representations, 2020, 13 pages.

Jonathan Frankle, Gintare Karolina Dziugaite, Daniel M Roy, and Michael Carbin. Linear mode connectivity and the lottery ticket hypothesis. arXiv preprint arXiv:1912.05671, 2019, 30 pages.

Haonan Yu, Sergey Edunov, Yuandong Tian, and Ari S. Morcos. Playing the lottery with rewards and multiple languages: lottery tickets in rl and nlp. In International Conference on Learning Representations, 2020, 12 pages.

Simon S Du, Wei Hu, and Jason D Lee. Algorithmic regularization in learning deep homogeneous models: Layers are automatically balanced. In Advances in Neural Information Processing Systems, pp. 384-395, 2018, 12 pages.

Stijn Verdenius, Maarten Stol, and Patrick Forré. Pruning via iterative ranking of sensitivity statistics. arXiv preprint arXiv:2006.00896, 2020, 25 pages.

Hörandner et al., "Credential: A Framework for Privacy-Preserving Cloud-Based Data Sharing", 2016 11th International Conference on Availability, Reliability and Security, 8 pages.

\* cited by examiner

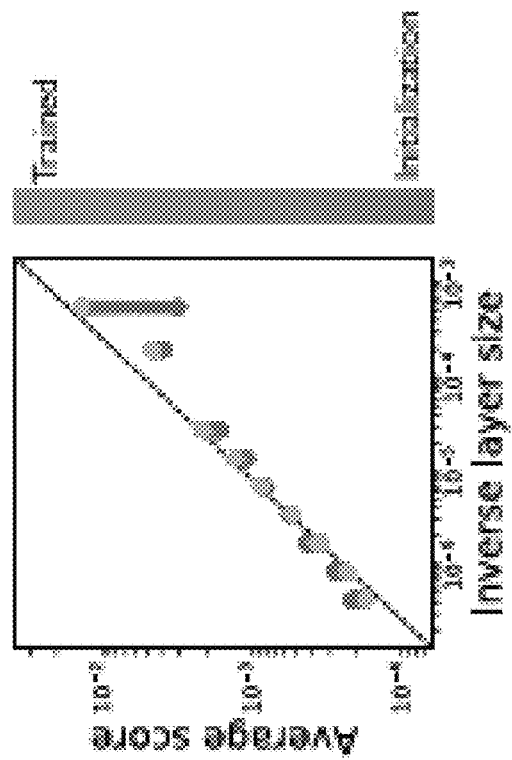
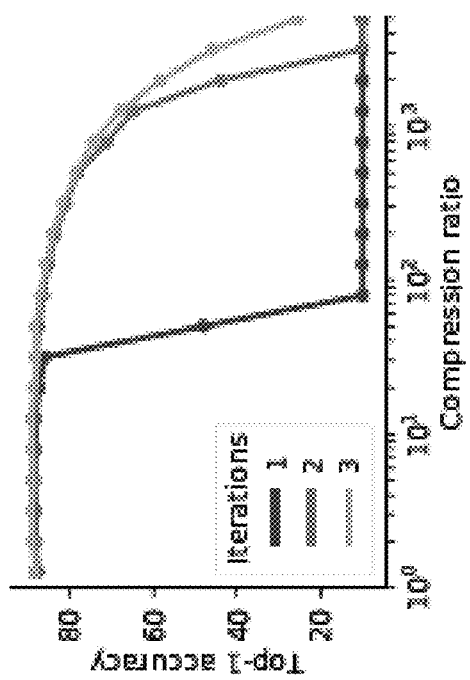
FIGURE 3A
FIGURE 3B

Input: network $f(x;\theta_0)$, compression ratio $\rho$, iteration steps $n$.
1: $\mu = 1$;
for $k \in [1, \ldots, n]$ do
   2: $\theta_\mu \leftarrow \mu \odot \theta_0$;      ▷ Mask parameters
   3: $\mathcal{R} \leftarrow \mathbb{1}^T \left( \prod_{l=1}^L |\theta_\mu^{(l)}| \right) \mathbb{1}$;      ▷ Evaluate SynFlow objective
   4: $\mathcal{S} \leftarrow \frac{\partial \mathcal{R}}{\partial \theta_\mu} \odot \theta_\mu$;      ▷ Compute SynFlow score
   5: $\tau \leftarrow (1 - \rho^{-k/n})$ percentile of $\mathcal{S}$;      ▷ Find threshold
   6: $\mu \leftarrow (\tau < \mathcal{S})$;      ▷ Update mask
end
7: $f(x; \mu \odot \theta_0)$;      ▷ Return masked network

FIGURE 7

SYSTEM AND METHOD FOR PRUNING NEURAL NETWORKS AT INITIALIZATION USING ITERATIVELY CONSERVING SYNAPTIC FLOW

PRIORITY CLAIMS/RELATED APPLICATIONS

This application claims the benefit under 35 USC 119(e) to U.S. Provisional Patent Application Ser. No. 63/052,317 filed Jul. 15, 2020 that is incorporated herein by reference.

APPENDIX

Appendix A (3 pages) has further proofs, hyperparameter choices for the SynFlow method and further experimental details that are incorporated herein and form part of the specification.

FIELD

The disclosure relates generally to neural network parameter pruning and in particular to a system and method for implementing an data agnostic iteratively conserving synaptic flow pruning system and method for neural networks parameters.

BACKGROUND

Network pruning, or the compression of neural networks by removing parameters, has been an important subject both for reasons of practical deployment as discussed in [1], [2], [3], [4], [5], [6], [7] and for theoretical understanding of artificial [8] and biological [9] neural networks. Conventionally, pruning algorithms have focused on compressing pre-trained models [1], [2], [3], [5], [6].

However, recent works [10], [11] have identified through iterative training and pruning cycles using iterative magnitude pruning that there exist sparse subnetworks (known as "winning tickets") in randomly-initialized neural networks that, when trained in isolation, can match the test accuracy of the original network. Moreover, it has been shown that some of these winning ticket subnetworks can generalize across datasets and optimizers [12]. While these results suggest training can be made more efficient by identifying winning ticket subnetworks at initialization, they do not provide any efficient algorithms to find them. Typically, it requires significantly more computational costs to identify winning tickets through iterative training and pruning cycles than simply training the original network from scratch [10], [11].

It is known that a neural network can be compressed in different ways including using micro-architectures [15], [16], [17], dimensionality reduction of network parameters [18], [19], and training of dynamic sparse networks [20], [21]. A preferred method involves neural network pruning.

Neural Network Pruning

Neural network pruning may be done after training or before training. When the pruning is performed after training, conventional pruning algorithms assign scores to parameters in neural networks after training and remove the parameters with the lowest scores [5], [22], [23]. Popular scoring metrics include weight magnitudes [4], [6], its generalization to multi-layers [24], first- [25], [26], [27] and second-order [2], [3], [27] Taylor coefficients of the training loss with respect to the parameters, and more sophisticated variants [28], [29], [30]. While these pruning algorithms can indeed compress neural networks at test time, there is no reduction in the cost of training which can be very expensive.

Recent works demonstrated that randomly initialized neural networks can be pruned before training with little or no loss in the final test accuracy [43], [32], [31]. In particular, the Iterative Magnitude Pruning (IMP) algorithm [10], [11] repeats multiple cycles of training, pruning, and weight rewinding to identify extremely sparse neural networks at initialization that can be trained to match the test accuracy of the original network. While IMP is powerful, it requires multiple cycles of expensive training and pruning with very specific sets of hyperparameters.

Avoiding these difficulties, a different approach uses the gradients of the training loss at initialization to prune the network in a single-shot [13], [14]. While these single-shot pruning algorithms at initialization are much more efficient, and work as well as IMP at moderate levels of sparsity, they suffer from layer-collapse, or the premature pruning of an entire layer rendering a network untrainable [13], [33]. Thus, these known methods suffer from layer collapse as shown in FIG. 8 in which each of the known methods (random, magnitude, SNIP, GraSP has their Top-1 accuracy reduces to zero before the maximum compression is reached.

Layer Collapse in Neural Network Pruning at Initialization

Thus, a key obstacle to pruning at initialization is layer collapse. Layer-collapse occurs when an algorithm prunes all parameters in a single weight layer even when prunable parameters remain elsewhere in the network. This renders the network untrainable, evident by sudden drops in the achievable accuracy for the network as shown in FIG. 8 as discussed above.

Broadly speaking, a pruning algorithm at initialization is defined by two steps in which a first step scores the parameters of a network according to some metric and the second step masks the parameters (removes or keeps the parameter) according to their scores. As discussed above, layer collapse leads to a sudden drop in accuracy. Thus, existing neural network parameter pruning methods all have the key problem of layer collapse [32], [14], [33/42] for existing neural network pruning algorithms using global-masking.

It is desirable to provide neural network pruning at initialization system and method that solves the above technical problem of layer collapse and computationally expensive pruning and can provide a highly sparse trainable subnetworks technical solution and maximum compression while being able to do so at initialization and without training data so that the system and method are data agnostic and it is to this end that the disclosure is directed.

BRIEF DESCRIPTION OF THE DRAWINGS

FIGS. 3A and 3B illustrate a compression ratio and an average square magnitude score per layer for a known magnitude pruning process;

FIG. 7 is an example of the pseudcode for the iterative snaptic flow pruning method;

DETAILED DESCRIPTION OF ONE OR MORE EMBODIMENTS

The disclosure is particularly applicable to the SynFlow process described below and it is in this context that the disclosure will be described. It will be appreciated, however, that the system and method has greater utility since the it may be varied that is within the scope of the disclosure.

The system and method may generate, an initialization a highly sparse trainable subnetwork that is data agnostic and may use, in one embodiment, an iterative synaptic flow pruning process to generate the highly sparse trainable subnetwork that achieves maximum compression of the neural network while avoiding layer collapse. The system and method may be implemented using other methods that achieve the highly sparse trainable subnetwork with maximum compression and no layer collapse that are within the scope of this disclosure.

Figure 1:
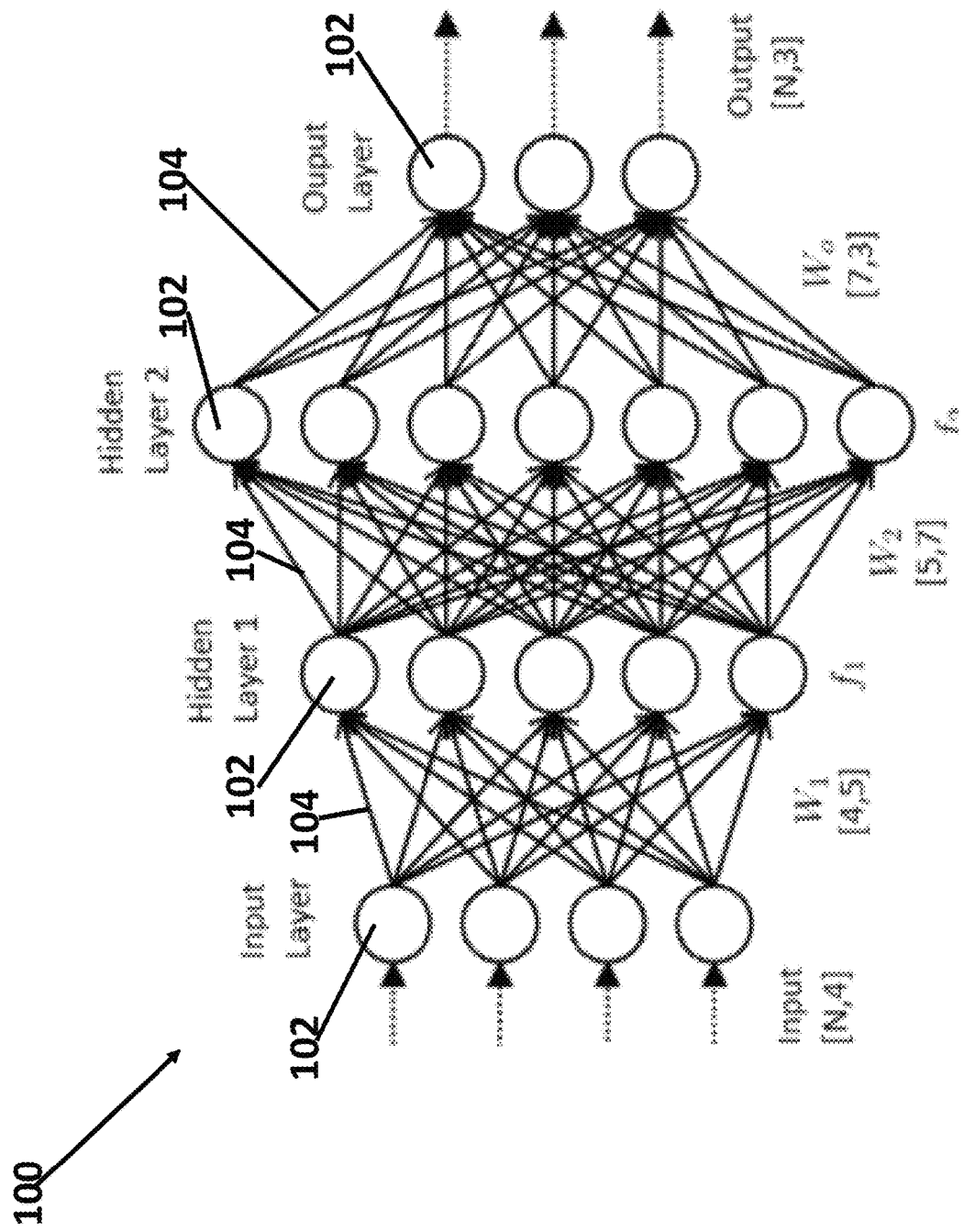
FIG. 1 illustrates an example of a neural network having one or more layers.

FIG. 1 illustrates an example of a neural network 100 having one or more layers. In the example in FIG. 1, the neural network has an input layer, one or more hidden layers (such as hidden layer 1 and hidden layer 2 as shown in FIG. 1) and an output layer. Each layer, such as the input layer or hidden layer 1, has one or more neurons 102 (each with one or more parameters) that make up each layer. The connections between the neurons may be assigned a weight as is well known in the art. As is known in the art, a neural network may have a plurality of layers each with a plurality of neurons so that it is desirable to be able to prune the neurons in the neural network as described above to reduce the time and computation resources required by the neural network in training or in use.

Figures 2A, 2B:
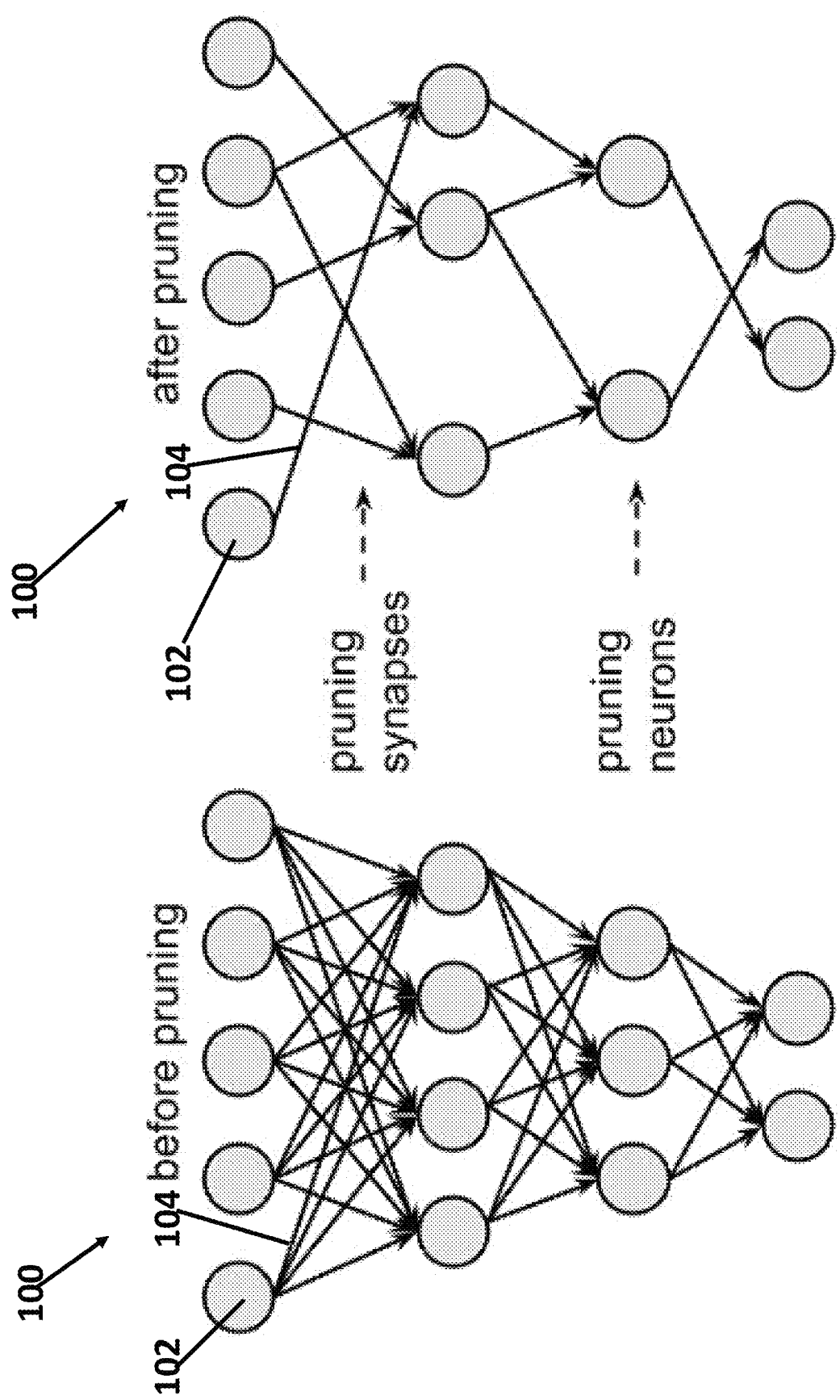
FIGS. 2A and 2B show an example of a neural network at initialization and after typical parameter pruning.

FIGS. 2A and 2B show an example of a neural network 100 at initialization and the neural network 100 after typical parameter pruning in which neurons at certain layers (pruning neurons) and certain connections between neurons (pruning synapses) are eliminated as is known in the art. In some pruning methods, the method always mask the parameters by simply removing the parameters with the smallest scores. This ranking process can be applied globally across the network, or layer-wise and empirically, it has been shown that global-masking performs far better than layer-masking, in part because it introduces fewer hyperparameters and allows for flexible pruning rates across the network [23].

Layer Collapse

Figure 8:
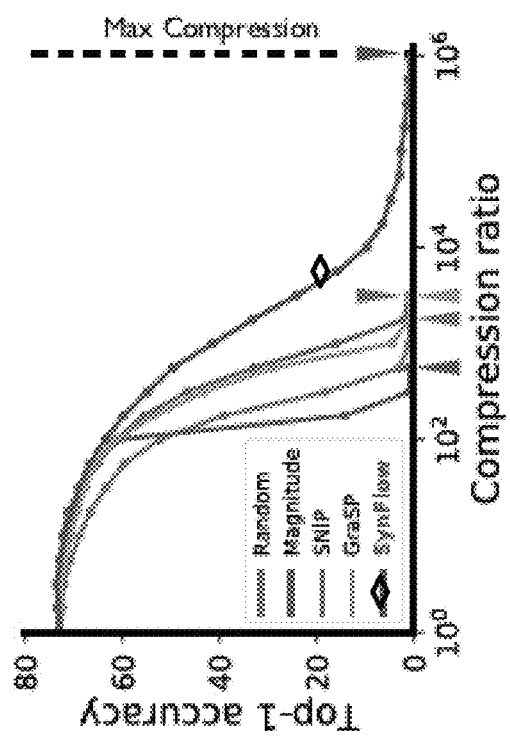
FIG. 8 shows a compression ratio of various known pruning processes as compared to the SynFlow method.

As discussed above, one problem for typical neural network pruning methods is the phenomenon known as layer collapse that does not occur in the novel pruning method disclosed below as shown in FIG. 8 and discussed in more detail below. To gain insight into the phenomenon of layer-collapse, it is useful to define some useful terms inspired by a recent paper studying this failure mode [30].

Given a network, a compression ratio (p) is the number of parameters in the original network divided by the number of parameters remaining after pruning. For example, when the compression ratio $\rho=10^3$, then only one out of a thousand of the parameters remain after pruning. A Max compression ($\rho_{max}$) is the maximal possible compression ratio for a network that doesn't lead to layer-collapse. For example, for a network with L layers and N parameters, $\rho_{max}$=N/L, which is the compression ratio associated with pruning all but one parameter per layer. A Critical compression ($\rho_{CR}$) is the maximal compression ratio a given pruning method can achieve without inducing layer-collapse. In particular, the critical compression of a pruning method is always upper bounded by the max compression of the network: $\rho_{CR} \leq \rho_{max}$. This inequality motivates the following new axiom that any successful pruning method should satisfy.

Axiom. Maximal Critical Compression—The critical compression of a pruning algorithm applied to a network should always equal the max compression of that network. In other words, this axiom implies a pruning algorithm should never prune a set of parameters that results in layer-collapse if there exists another set of the same cardinality that will keep the network trainable. No existing pruning algorithms known with global-masking satisfies this simple axiom which means layer collapse that is a technical problem with these known neural network pruning methods that use global-masking.

Any pruning algorithm could be modified to satisfy the axiom by introducing specialized layer-wise pruning rates. However, to retain the benefits of global-masking [23], the modification of any pruning method would not provide the goal of a pruning method with global-masking that does not cause layer collapse. However, the disclosed SynFlow pruning method satisfies this axiom while maintaining the global-masking in a data agnostic manner and thus provides a technical solution to the technical problem of the known pruning methods and the disclosed SynFlow method and system outperforms existing state-of-the-art pruning algorithms (as shown in FIG. 8 and discussed below), all while not using the data or requiring training.

To provide evidence of the technical benefit of the novel SynFlow system and method, the SynFlow process is benchmarked against two simple baselines (random scoring and scoring based on weight magnitudes (Magnitude) which are lines farthest to the left and having the lowest compression ratio as shown in FIG. 8) as well as two state-of-the-art known single-shot pruning algorithms, Single-shot Network Pruning based on Connection Sensitivity (SNIP) [13] and Gradient Signal Preservation (GraSP) [14] that are also shown in FIG. 8. SNIP [13] is a pioneering algorithm to prune neural networks at initialization by scoring weights based on the gradients of the training loss. GraSP [14] is a more recent algorithm that aims to preserve gradient flow at initialization by scoring weights based on the Hessian-gradient product. Both SNIP and GraSP have been thoroughly benchmarked by [14] against other state-of-the-art pruning algorithms that involve training [2], [34], [10], [11], [35], [21], [20], demonstrating competitive performance. As shown in FIG. 8, however, all of the existing pruning methods suffer from layer collapse (since none achieves the maximum compression) and has low compression ratios that once again show that each of the existing pruning method has the same technical problem that is solved by the novel SynFlow system and method as described below in more detail.

Conservation Laws of Synaptic Saliency

Figure 9:
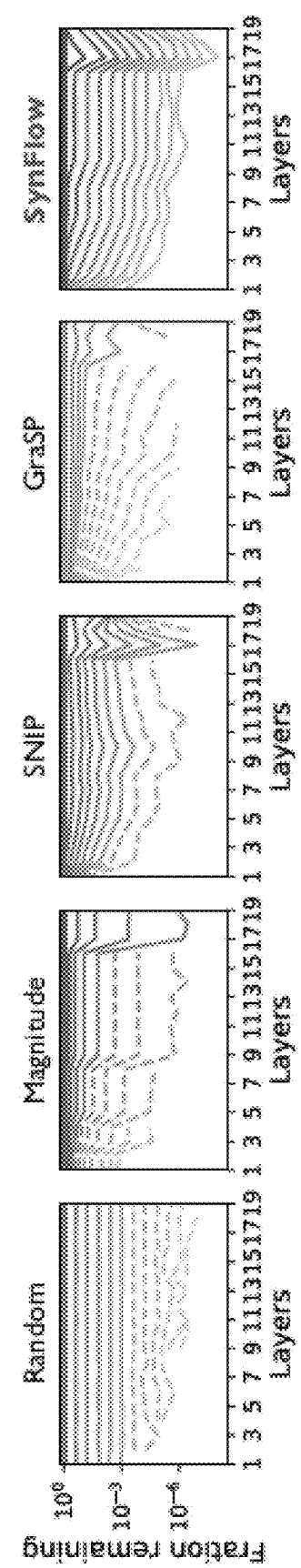
FIG. 9 shows a layer collapse of various known pruning processes as compared to layer collapse of the SynFlow method.

As shown in FIG. 8, with increasing compression ratios, existing random, magnitude, and gradient-based pruning algorithms will prematurely prune an entire layer (layer collapse) making the network untrainable. It is desirable to understand why certain score metrics lead to layer-collapse. FIG. 9 shows the fraction of parameters remaining at each layer of the same known VGG-19 data model pruned at initialization with ImageNet over a range of compression ratios ($4^n$ for n=0, 1, ..., 11). A higher transparency shown in FIG. 9 represents a higher compression ratio and a dashed line indicates that there is at least one layer with no parameters, implying layer-collapse has occurred for that algorithm. Random pruning (far left chart in FIG. 9) prunes every layer in a network by the same amount, evident by the horizontal lines. With random pruning, the smallest layer which is the layer with the least parameters, is the first to be fully pruned.

Conversely, magnitude pruning (second chart in FIG. 9) prunes layers at different rates, evident by the staircase pattern in FIG. 9. The Magnitude pruning effectively prunes parameters based on the variance of their initialization, which for common network initializations, such as Xavier [36] or Kaiming [37], and are inversely proportional to the width of a layer [33/42]. With magnitude pruning the widest layers which are the layers with largest input or output dimensions, are the first to be fully pruned.

The gradient-based pruning algorithms SNIP [13] and GraSP [14] also prune layers at different rates, but it is less clear about the root cause for this preference. In particular, both SNIP and GraSP aggressively prune the largest layer which is the layer with the most trainable parameters, evident by the sharp peaks in FIG. 9.

Based on these observations, gradient-based scores averaged within a layer are inversely proportional to the layer size. To test this, a theoretical framework grounded in flow networks is constructed in which: 1) a general class of gradient-based scores is defined to prove a conservation law for these scores; and 2) use this law to prove that the inverse proportionality between layer size and average layer score holds exactly.

A General Class of Gradient-Based Scores

Synaptic saliency is any score metric that can be expressed as the Hadamard product:

$$\mathcal{S}(\theta) = \frac{\partial \mathcal{R}}{\partial \theta} \odot \theta.$$

where R is a scalar loss function of the output of a feedforward network parameterized by θ. When R is the training loss L, the resulting synaptic saliency metric is equivalent (modulo sign) to $$-\frac{\partial \mathcal{L}}{\partial \theta} \odot \theta,$$

the score metric used in Skeletonization [1], one of the first network pruning algorithms. The resulting metric is also closely related to $$\left| \frac{\partial \mathcal{L}}{\partial \theta} \odot \theta \right|$$

that is the score used in SNIP [13], $$-\left( H \frac{\partial \mathcal{L}}{\partial \theta} \right) \odot \theta$$

the score used in GraSP, and $$\left( \frac{\partial \mathcal{L}}{\partial \theta} \odot \theta \right)^2$$

the score used in the pruning after training algorithm Taylor-FO [27]. This general class of score metrics, while not encompassing, exposes key properties of gradient-based scores used for pruning.

The Conservation of Synaptic Saliency

All synaptic saliency metrics respect two surprising conservation laws that hold at any initialization and step in training.

Theorem 1. Neuron-wise Conservation of Synaptic Saliency—For a feedforward neural network with homogenous activation functions, $\phi = \phi'(x)x$, (e.g. ReLU, Leaky ReLU, linear), the sum of the synaptic saliency for the incoming parameters to a hidden neuron ($S^{in}$) is equal to the sum of the synaptic saliency for the outgoing parameters from the hidden neuron ($S^{out}$).

To prove this theorem 1, consider the $j^{th}$ hidden neuron of a network with outgoing parameters $\theta_{ij}^{out}$ and incoming parameters $\theta_{jk}^{in}$, such that $$\frac{\partial \mathcal{R}}{\partial \phi(z_j)} = \sum_i \frac{\partial \mathcal{R}}{\partial z_i} \theta_{ij}^{out}$$

and $$z_j = \sum_k \theta_{jk}^{in} \phi(z_k).$$

The sum of the synaptic saliency for the outgoing parameters is:

$$S^{out} = \sum_i \frac{\partial \mathcal{R}}{\partial \theta_{ij}^{out}} \theta_{ij}^{out} = \sum_i \frac{\partial \mathcal{R}}{\partial z_i} \phi(z_j) \theta_{ij}^{out} = \left( \sum_i \frac{\partial \mathcal{R}}{\partial z_i} \theta_{ij}^{out} \right) \phi(z_j) = \frac{\partial \mathcal{R}}{\partial \phi(z_j)} \phi(z_j)$$

The sum of the synaptic saliency for the incoming parameters is:

$$S^{in} = \sum_k \frac{\partial \mathcal{R}}{\partial \theta_{jk}^{in}} \theta_{jk}^{in} = \sum_k \frac{\partial \mathcal{R}}{\partial z_j} \phi(z_k) \theta_{jk}^{in} = \frac{\partial \mathcal{R}}{\partial z_j} \left( \sum_k \theta_{jk}^{in} \phi(z_k) \right) = \frac{\partial \mathcal{R}}{\partial z_j} z_j$$

When φ is homogeneous, then $$\frac{\partial \mathcal{R}}{\partial \phi(z_j)} \phi(z_j) = \frac{\partial \mathcal{R}}{\partial z_j} z_j.$$

The neuron-wise conservation of synaptic saliency implies network conservation as well.

Theorem 2. Network-wise Conservation of Synaptic Saliency. —The sum of the synaptic saliency across any set of parameters that exactly separates the input neurons x from the output neurons y of a feedforward neural network with homogenous activation functions equals $$\left\langle \frac{\partial \mathcal{R}}{\partial x}, \hat{x} \right\rangle = \left\langle \frac{\partial \mathcal{R}}{\partial y}, \hat{y} \right\rangle.$$

Theorem 2 is proven in Appendix A by applying the neuron-wise conservation law recursively. Similar conservation properties have been noted in the neural network interpretability literature and have motivated the construction of interpretability methods such as Conductance [38] and Layer-wise Relevance Propagation [39], which have recently been modified for network pruning [9], [40]. While the interpretability literature has focused on attribution to the input pixels and hidden neuron activations, the SynFlow method uses conservation laws that are more general and applicable to any parameter and neuron in a network. Remarkably, these conservation laws of synaptic saliency apply to modern neural network architectures and a wide variety of neural network layers (e.g. dense, convolutional, batchnorm, pooling, residual) as visually demonstrated in FIG. 10A in which each dot represents a hidden unit from the feature-extractor of a VGG-19 model pruned at initialization with ImageNet, the location of each dot corresponds to the total score for the unit's incoming and outgoing parameters, ($S^{in}$ and $S^{out}$) and the black dotted line represents exact neuron-wise conservation of score.

Figure 10A:
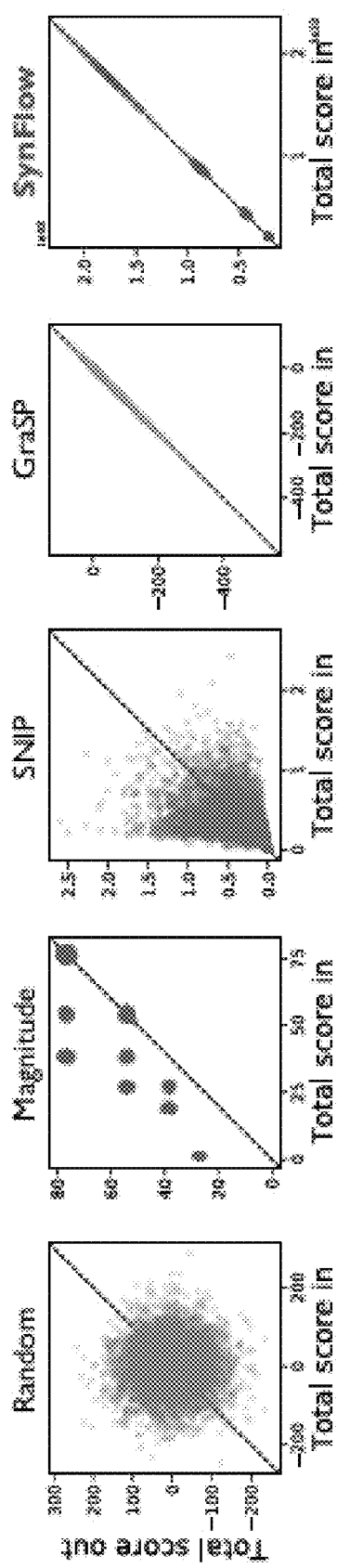
FIG. 10A shows a neuron-wise conservation of score for various known pruning processes as compared to layer collapse of the SynFlow method.
Figure 10B:
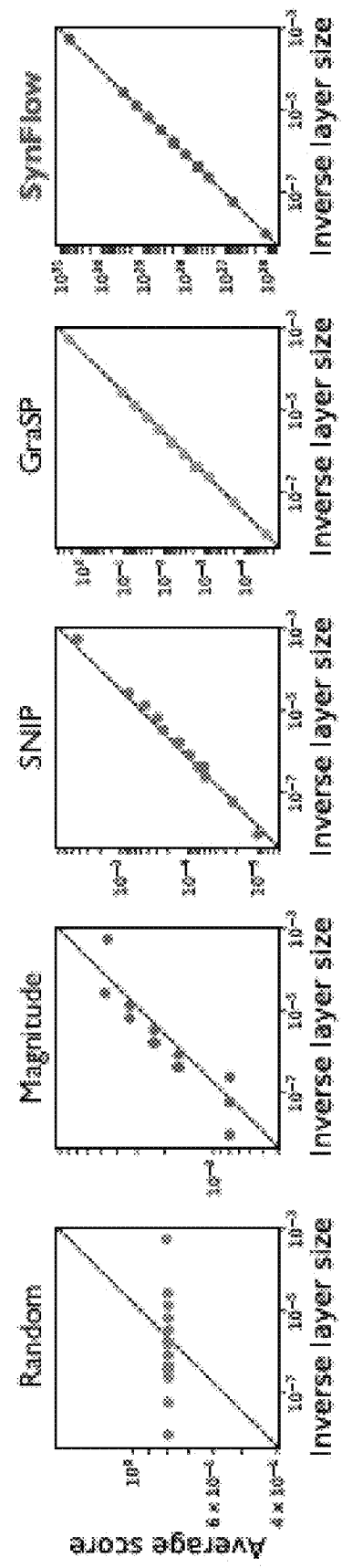
FIG. 10B shows an inverse relationship between layer size and average layer score of various known pruning processes as compared to layer collapse of the SynFlow method.

FIG. 10B shows the inverse relationship between layer size and average layer score with each dot represents a layer from a VGG-19 model pruned at initialization with ImageNet, the location of each dot corresponds to the layer's average score and inverse number of elements and the black dotted line represents a perfect linear relationship.

Conservation and Single-Shot Pruning Leads to Layer-Collapse

The conservation laws of synaptic saliency provide the method with the theoretical tools to validate the earlier hypothesis of inverse proportionality between layer size and average layer score as a root cause for layer-collapse of gradient-based pruning methods. Consider the set of parameters in a layer of a simple, fully connected neural network. This set would exactly separate the input neurons from the output neurons. Thus, by the network-wise conservation of synaptic saliency (theorem 2 above), the total score for this set is constant for all layers, implying the average is inversely proportional to the layer size. This relationship can be empirically evaluated at scale for existing pruning methods by computing the total score for each layer of a model, as shown in FIG. 10B. While this inverse relationship is exact for synaptic saliency, other closely related gradient-based scores, such as the scores used in SNIP and GraSP, also respect this relationship. This validates the empirical observation that for a given compression ratio, gradient-based pruning methods will disproportionately prune the largest layers. Thus, if the compression ratio is large enough and the pruning score is only evaluated once, then a gradient-based pruning method will completely prune the largest layer leading to layer-collapse.

Magnitude Pruning Avoids Layer-Collapse with Conservation and Iteration

Known iterative pruning methods appear to avoid the layer collapse issue, but cannot generate the highly sparse neural networks. For example, Iterative Magnitude Pruning (IMP or Magnitude as shown in the figures) is a recently proposed pruning algorithm that has proven to be successful in finding extremely sparse trainable neural networks at initialization (winning lottery tickets) [10], [11], [12], [41], [33], [43], [44]. The algorithm follows three simple steps that include: First train a network, second prune parameters with the smallest magnitude, third reset the unpruned parameters to their initialization and repeat until the desired compression ratio. While simple and powerful, IMP is impractical as it involves training the network several times, essentially defeating the purpose of constructing a sparse initialization, but does not suffer from the same catastrophic layer-collapse that other pruning at initialization to which other methods are susceptible.

As has been noted previously [10], [11], iteration is essential for stabilizing IMP. In fact, without sufficient pruning iterations, IMP will suffer from layer-collapse, evident in the sudden accuracy drops for the darker curves in FIG. 3B. However, the number of pruning iterations alone cannot explain IMP's success at avoiding layer-collapse. Notice that if MIP didn't train the network during each prune cycle, then, no matter the number of pruning iterations, it would be equivalent to single-shot magnitude pruning with layer collapse. Thus, something very critical must happen to the magnitude of the parameters during training, that when coupled with sufficient pruning iterations allows IMP to avoid layer-collapse. The gradient descent training effectively encourages the scores to observe an approximate layer-wise conservation law, which when coupled with sufficient pruning iterations allows IMP to avoid layer-collapse.

FIGS. 3A and 3B illustrate a compression ratio and an average square magnitude score per layer for a known magnitude pruning process. As shown in FIG. 3A, multiple iterations of training-pruning cycles is needed to prevent IMP from suffering layer-collapse. Further, as shown in FIG. 3B, the average square magnitude scores per layer, originally at initialization (blue), converge through training towards a linear relationship with the inverse layer size after training (pink), suggesting layer-wise conservation. In these figures, all data is from a VGG-19 model trained on CIFAR-10.

Gradient Descent Encourages Conservation

To better understand the dynamics of the IMP algorithm during training, a differentiable score $$S(\theta_i) = \frac{1}{2}\theta_i^2$$

is considered that is algorithmically equivalent to the magnitude score. Consider these scores throughout training with gradient descent on a loss function L using an infinitesimal step size (i.e. gradient flow). In this setting, the temporal derivative of the parameters is equivalent to $$\frac{d\theta}{dt} = -\frac{\partial \mathcal{L}}{\partial \theta},$$

and thus the temporal derivative of the score is:

$$\frac{d}{dt}\frac{1}{2}\theta_i^2 = \frac{d\theta_i}{dt} \odot \theta_i = -\frac{\partial \mathcal{L}}{\partial \theta_i} \odot \theta_i$$

Surprisingly, this is a form of synaptic saliency and thus the neuron-wise and layer-wise conservation laws described above apply. In particular, this implies that for any two layers l and k of a simple, fully connected network, then:

$$\frac{d}{dt}\|W^{[l]}\|_F^2 = \frac{d}{dt}\|W^{[k]}\|_F^2$$

This invariance has been noticed before by [45] as a form of implicit regularization and used to explain the empirical phenomenon that trained multi-layer models can have similar layer-wise magnitudes. In the context of pruning, this phenomenon implies that gradient descent training, with a small enough learning rate, encourages the squared magnitude scores to converge to an approximate layer-wise conservation, as shown in FIG. 3B.

Conservation and Iterative Pruning Avoids Layer-Collapse

As explained above, conservation alone leads to layer-collapse by assigning parameters in the largest layers with lower scores relative to parameters in smaller layers. However, if conservation is coupled with iterative pruning, then when the largest layer is pruned, becoming smaller, then in subsequent iterations the remaining parameters of this layer will be assigned higher relative scores. With sufficient iterations, conservation coupled with iteration leads to a self-balancing pruning strategy allowing IMP to avoid layer-collapse. This insight on the importance of conservation and iteration applies more broadly to other algorithms with exact or approximate conservation properties (e.g. Skeletonization, SNIP, and GraSP as demonstrated above. Indeed, very recent work empirically confirms that iteration improves the performance of SNIP [46].

One or More Embodiments of the SynFlow System

Figure 4:
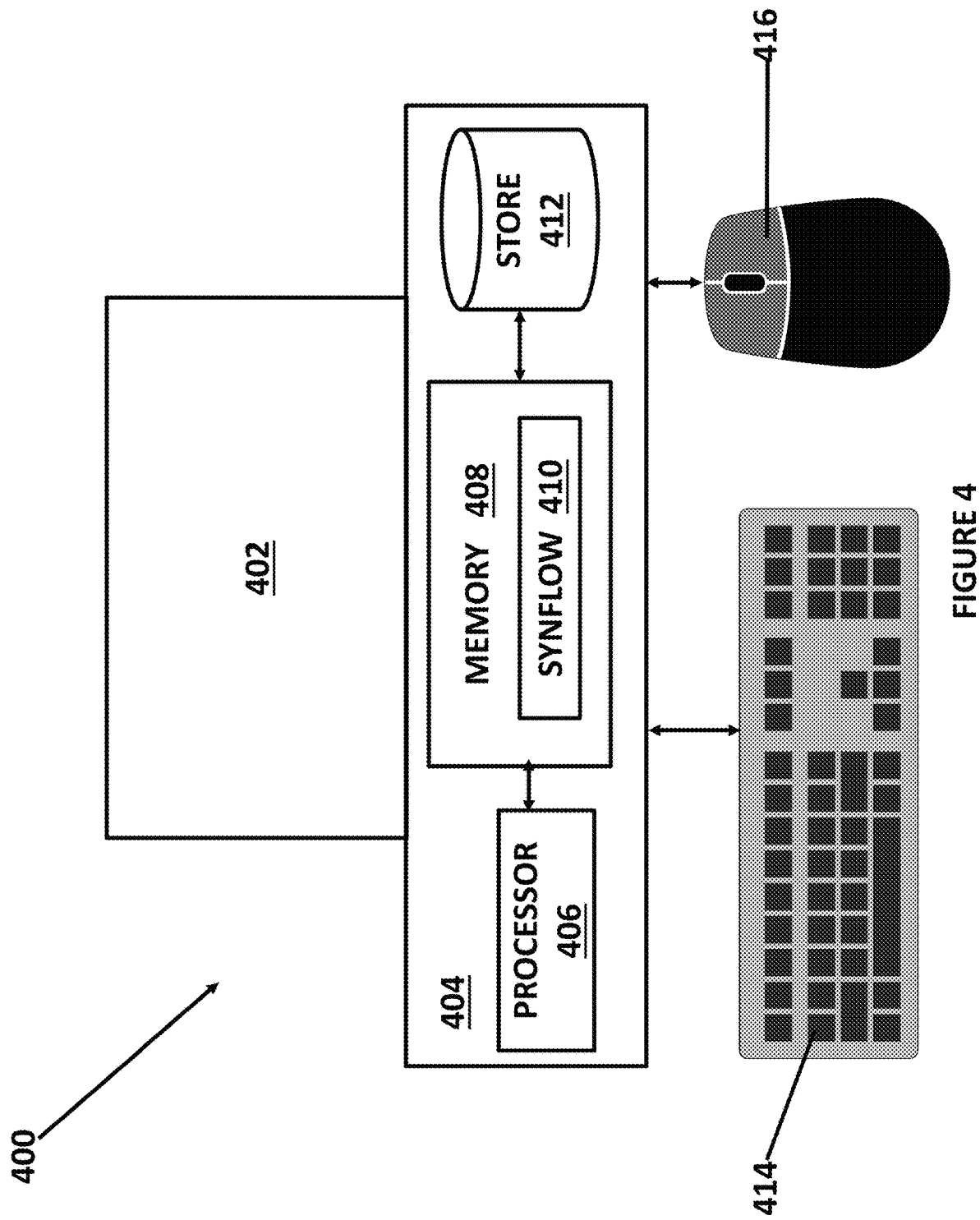
FIG. 4 illustrates a example of a computing device that may generate a highly sparse trainable subnetworks at initialization using a novel SynFlow process and utilize the highly sparse trainable subnetworks.

FIG. 4 illustrates an example of a computing device 400 that may generate a highly sparse trainable subnetworks at initialization using a novel SynFlow process and utilize the highly sparse trainable subnetworks. It should be understood that the SynFlow process may also be implemented using cloud computing services, a mainframe computer, a client server architecture, a laptop computer and/or even a smartphone device that has sufficient processing power to perform the SynFlow process and then be able to implement the trainable highly sparse neural network generated by the SynFlow process.

In the example in FIG. 4, the computing device 400 has a display 402 and a chassis/body 404 that houses one or more processors 406 that are interconnected to memory 408 and a store device 412. In the example shown in FIG. 4, a SynFlow process 410 is implemented as a plurality of lines of instructions that reside in the store 412 or memory 408 and are executed by the one or more processors 406 that are then configured to perform the SynFlow process as described below. In alternative embodiments, the SynFlow process may be implemented in a hardware device (FPGA, state machine, integrated circuit) that also perform the SynFlow process as described below. When the SynFlow process 410 is implemented in software, the code/instructions may be stored in the store 412 along with the neural network data and possible the data being analyzed using the trainable highly sparse neural network that results from the SynFlow process 410. The computing device may further have input/output devices 414, 416 (such as the keyboard 414 that may be a physical keyboard or a virtual keyboard on a touchscreen, etc., and the mouse 416) that permit the user of the computing device 400 to interact with the SynFlow process 410 and the resultant trainable highly sparse neural network.

The SynFlow process 410 may implement an iterative synaptic flow neural network pruning process ("SynFlow") that generates the trainable, highly sparse neural network with a high level of compression that does not suffer layer collapse. Furthermore, the SynFlow process 410 can be performed at initialization and without any training so that the SynFlow process is data agnostic. In addition to generating the trainable, highly sparse neural network, the system 400 shown in FIG. 4 may use the trainable, highly sparse neural network to perform data processing operations of piece of data in the same manner that a typical neural network would do.

Figure 5:
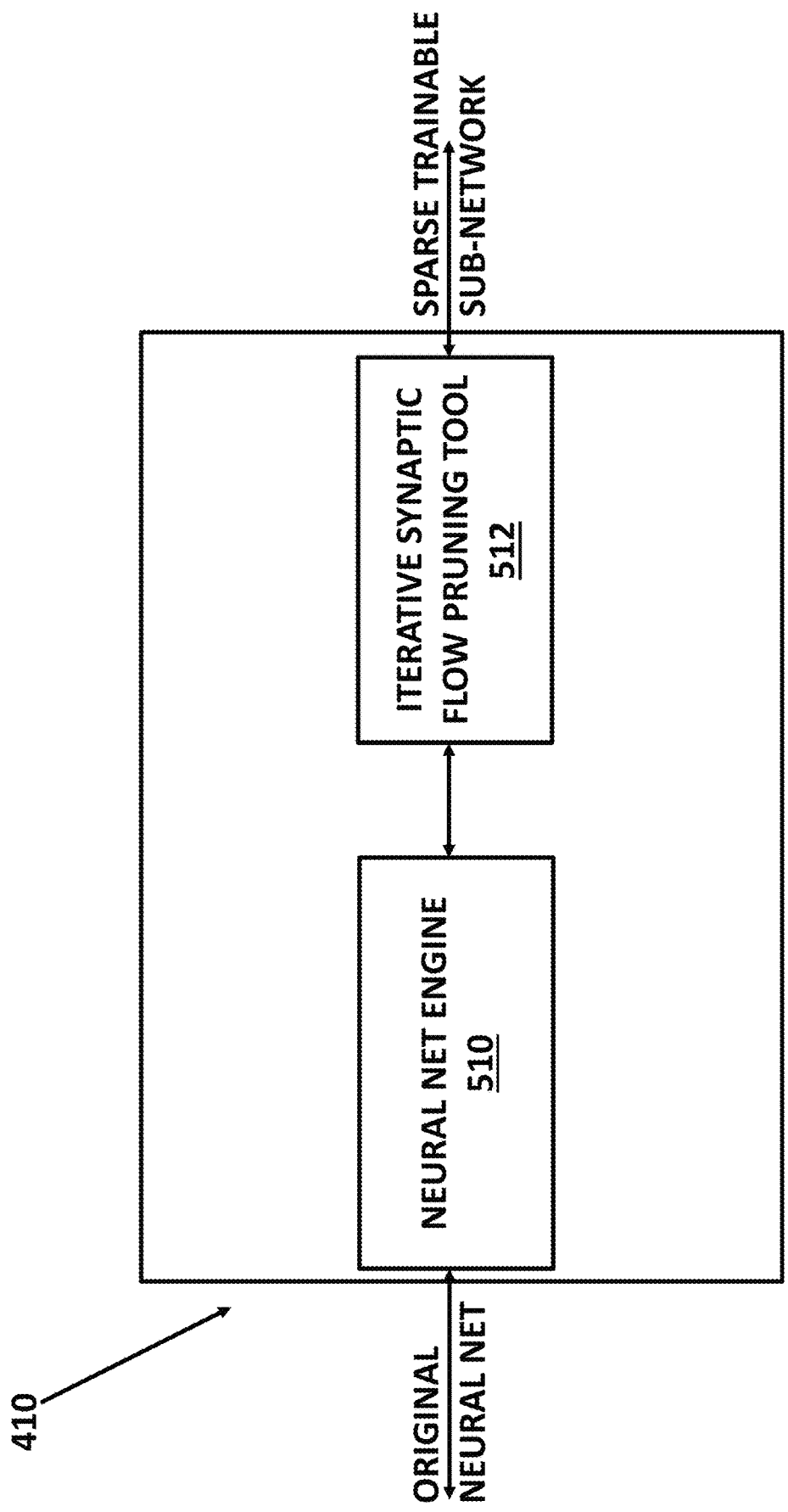
FIG. 5 illustrates more details of an implementation of the SynFlow system.

FIG. 5 illustrates more details of an implementation of the SynFlow system 410. As described above the elements 510, 512 shown in FIG. 5 of the SynFlow system 410 may be implemented in software (plurality of lines of code/instructions executed on a processor so that the processor is configured to perform the processes or hardware. As shown in FIG. 5, the SynFlow system 410 may include a neural network engine 510 that is connected to an iterative synaptic flow pruning tool 512 as shown. The neural network engine 510 may store an incoming original neural network to be pruned and pass the incoming original neural network onto the iterative synaptic flow pruning tool 512. The iterative synaptic flow pruning tool 512 then performs the iterative synaptic flow pruning process (SynFlow) on the incoming original neural network to generate the trainable, highly sparse sub-network neural network without training data or data sets and without training the neural network so that the SynFlow process is data agnostic. Furthermore, the output of the SynFlow process 410 is trainable since the SynFlow process 410, regardless of compression ratio, does not suffer from layer collapse while compression the neural network.

A Data-Agnostic Algorithm Satisfying Maximal Critical Compression

As discussed above, two attributes of the known Magnitude method to avoid layer-collapse include: (i) approximate layer-wise conservation of the pruning scores, and (ii) the iterative re-evaluation of these scores. While these properties allow the Magnitude method to identify high performing and highly sparse, trainable neural networks, the Magnitude method requires an impractical amount of computation to obtain them and thus the known Magnitude method has a technical problem of the impractical amount of computation. The SynFlow method provides a technical solution to this technical problem by providing a more efficient pruning method that does not require the impractical amount of computation.

The SynFlow method avoids layer-collapse and provably attains Maximal Critical Compression as shown by the below theorem whose proof is shown in Appendix A that forms part of the specification.

Theorem 3—Iterative, positive, conservative scoring achieves Maximal Critical Compression—If a pruning algorithm, with global-masking, assigns positive scores that respect layer-wise conservation and if the algorithm re-evaluates the scores every time a parameter is pruned, then the algorithm satisfies the Maximal Critical Compression axiom.

The Iterative Synaptic Flow Pruning (SynFlow) Method

The theorem above directly motivates the design of SynFlow, that provably reaches Maximal Critical Compression. First, the necessity for iterative score evaluation discourages algorithms that involve backpropagation on batches of data, and instead motivates the development of an efficient data-independent scoring procedure. Second, positivity and conservation motivates the construction of a loss function that yields positive synaptic saliency scores. These insights are combined to introduce a new loss function (where $\mathbb{1}$ is the all ones vector and $|\theta^{[l]}|$ is the element-wise absolute value of parameters in the $l^{th}$ layer), $$\mathcal{R}_{SF} = \mathbb{1}^T \left( \prod_{l=1}^{L} |\theta^{[l]}| \right) \mathbb{1}$$

that yields the positive, synaptic saliency scores $$\left( \frac{\partial \mathcal{R}_{SF}}{\partial \theta} \odot \theta \right)$$

called Synaptic Flow. For a simple, fully connected network (i.e. $f(x)=W^{[N]} \ldots W^{[1]}x$), the Synaptic Flow score for a parameter $w^{[l]}_{ij}$ may be factored as $$\mathcal{S}_{SF}(w^{[l]}_{ij}) = \left[ \mathbb{1}^T \prod_{k=l+1}^{N} |W^{[k]}| \right]_i |w^{[l]}_{ij}| \left[ \prod_{k=1}^{l-1} |W^{[k]}| \mathbb{1} \right]_j$$

This perspective demonstrates that Synaptic Flow score is a generalization of magnitude score ($|w_{ij}^{[l]}|$), where the scores consider the product of synaptic strengths flowing through each parameter, taking the inter-layer interactions of parameters into account. The Synaptic Flow score in the Iterative Synaptic Flow Pruning (SynFlow) method shown in FIGS. 6 and 7 and now described in more detail.

Figure 6:
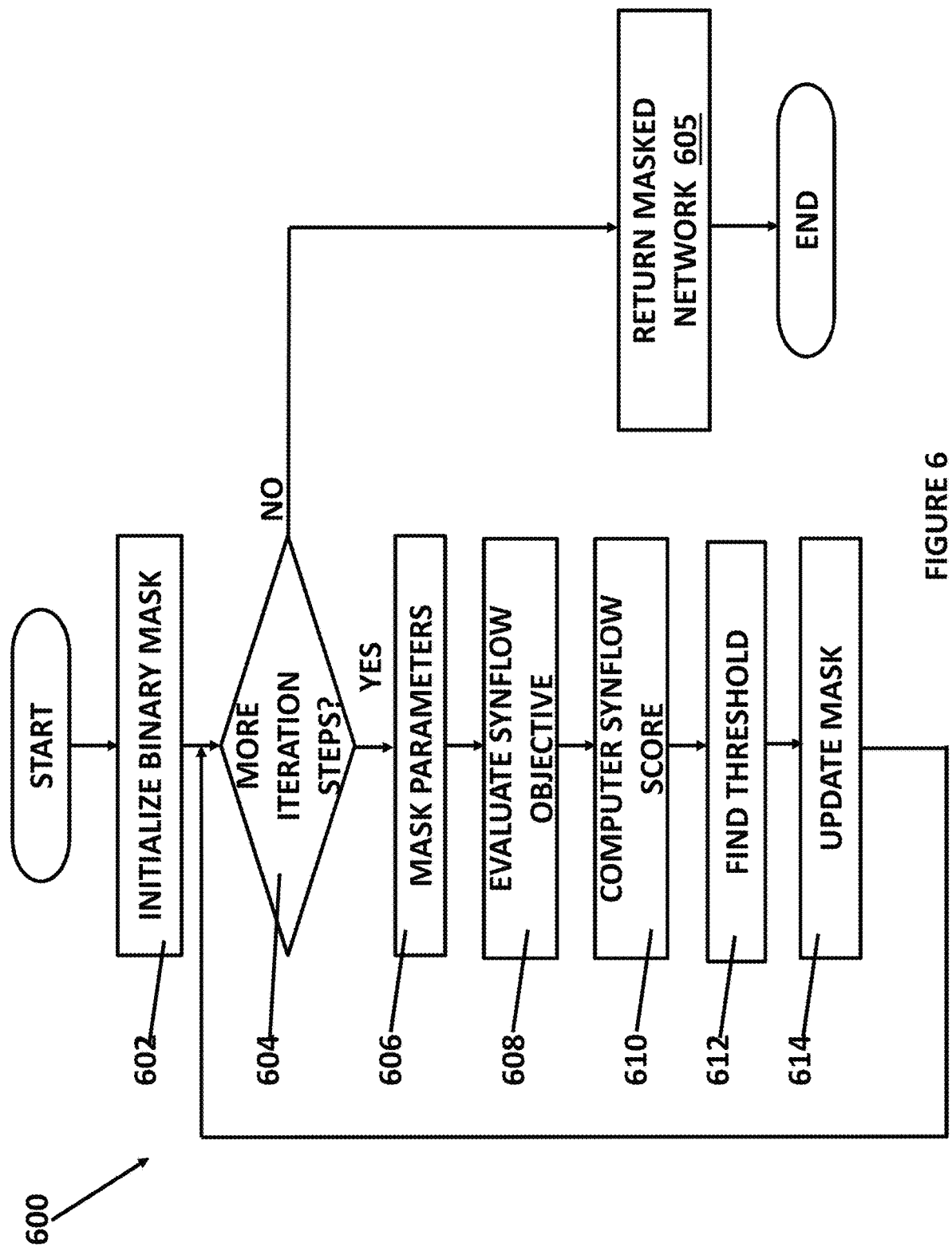
FIG. 6 illustrates an iterative snaptic flow pruning method.

FIG. 6 illustrates an iterative snaptic flow pruning method 600 and FIG. 7 is an example of the pseudocode for the iterative snaptic flow pruning method. In one embodiment, the method 600 is performed by the system shown in FIGS. 4 and 5, but may also be performed on other systems and in other environments that are within the scope of this disclosure. Once the method receives the initial neural network with its neurons and synapses, the method initializes the binary mask (602). As shown in the pseudocode example in FIG. 7, the input may by a neural network f(x; θ₀), a compression ratio ρ and iterations n. Unlike other known pruning methods, the SynFlow method requires only one additional hyperparameter, the number of pruning iterations n.

The method may check to see if there are more iteration steps (604) and, if there are no more iteration steps (meaning that the method has been completed to generate the trainable, highly sparse neural network), the method returns/outputs a masked network that is the trainable, highly sparse neural network (605). A trainable, highly sparse neural network is a neural network having less than 10% of the original number of parameters remaining after the pruning. If there are additional iteration steps, the method mask parameters (606) of neurons of the neural network. During the masking process (606), the method scores the parameters of a network according to some metric, such as the Synflow score/metric discussed above, and masks the parameters (removes or keeps the parameter) according to their scores. In this method, the method may evaluate the Synflow objective (608) and then computes a Synflow score (610) as discussed above. The method may then find the threshold (612) for each parameter and determine if each parameter meets the threshold and the updates the mask (614) with the parameters that meet the threshold. As shown in FIG. 7, the threshold, given the desired sparsity of parameters, the automatically determined by the process $$\left( \tau \leftarrow \left( 1 - \rho^{-\frac{k}{n}} \right) \right)$$

percentile of S) where S is the Synflow score. Thus, the threshold is a percentile of the Synflow score that is determined based on the desired reduced parameters for the trainable, highly sparse neural network being produced.

The method then loops back to determine if there are more iteration steps. In this manner, the method 600 generates the trainable, highly sparse neural network. As detailed in the attached Appendix A (Hyperparameters), it is shown that an exponential pruning schedule ($\rho^{-k/n}$) with n=100 pruning iterations essentially prevents layer-collapse whenever avoidable (for example see FIG. 8 described below), while remaining computationally feasible, even for large networks.

FIG. 8 shows a compression ratio of various known pruning processes as compared to the SynFlow method. FIG. 8 shows the Top-1 test accuracy as a function of the compression ratio at initialization for a VGG-16 model pruned at initialization and trained on CIFAR-100. The colored arrows along the horizontal axis represent the critical compression each corresponding pruning methods before collapse. As shown in FIG. 8, the known random, Magnitude, SNIP and GraSP pruning methods all have their accuracy reduce to zero at compression ratios between 100 and 10000 meaning that all of the known methods suffer layer collapse and do not achieve a maximum compression ratio. In contrast, the SynFlow method (shown in FIGS. 6-7 and as the line with the diamond indicator in FIG. 8) does not suffer layer collapse and achieves the maximum compression thus outputting the trainable, highly sparse neural network that is a technical solution to the technical problems of the known pruning methods. While FIG. 8 shows a maximum compression of $10^6$, each configuration of a deep learning model has its own corresponding maximum compression ratio as is known in the art and each maximum compression ratio ensures that at least one parameter remains per layer of the neural network.

As described above, FIG. 9 shows a layer collapse of various known pruning processes as compared to layer collapse of the SynFlow method. As shown, each of the known methods (random, Magnitude, SNIP and GraSP) suffer layer collapse (dotted lines) in certain layers and certain compression ratios and thus cannot produce a trainable highly sparse neural network which is a technical problem of the known pruning methods. In contrast, the SynFlow method described above does not suffer from layer collapse at any compression ratio as shown in FIG. 9 since none of the lines/layers in FIG. 9 are dotted. Thus, the SynFlow method provides a technical solution as described above that overcomes the technical problem of layer collapse of known pruning methods.

FIG. 10A shows a neuron-wise conservation of score for various known pruning processes as compared to layer collapse of the SynFlow method and FIG. 10B shows an inverse relationship between layer size and average layer score of various known pruning processes as compared to layer collapse of the SynFlow method as described above. As shown in these figures, unlike the known algorithms that do not provide exact neuron-wise conversation of score and a perfect linear relationship of the average score, the Syn-Flow method achieves both which shows the advantage of the SynFlow method over the known pruning methods.

Experiments

Figure 11:
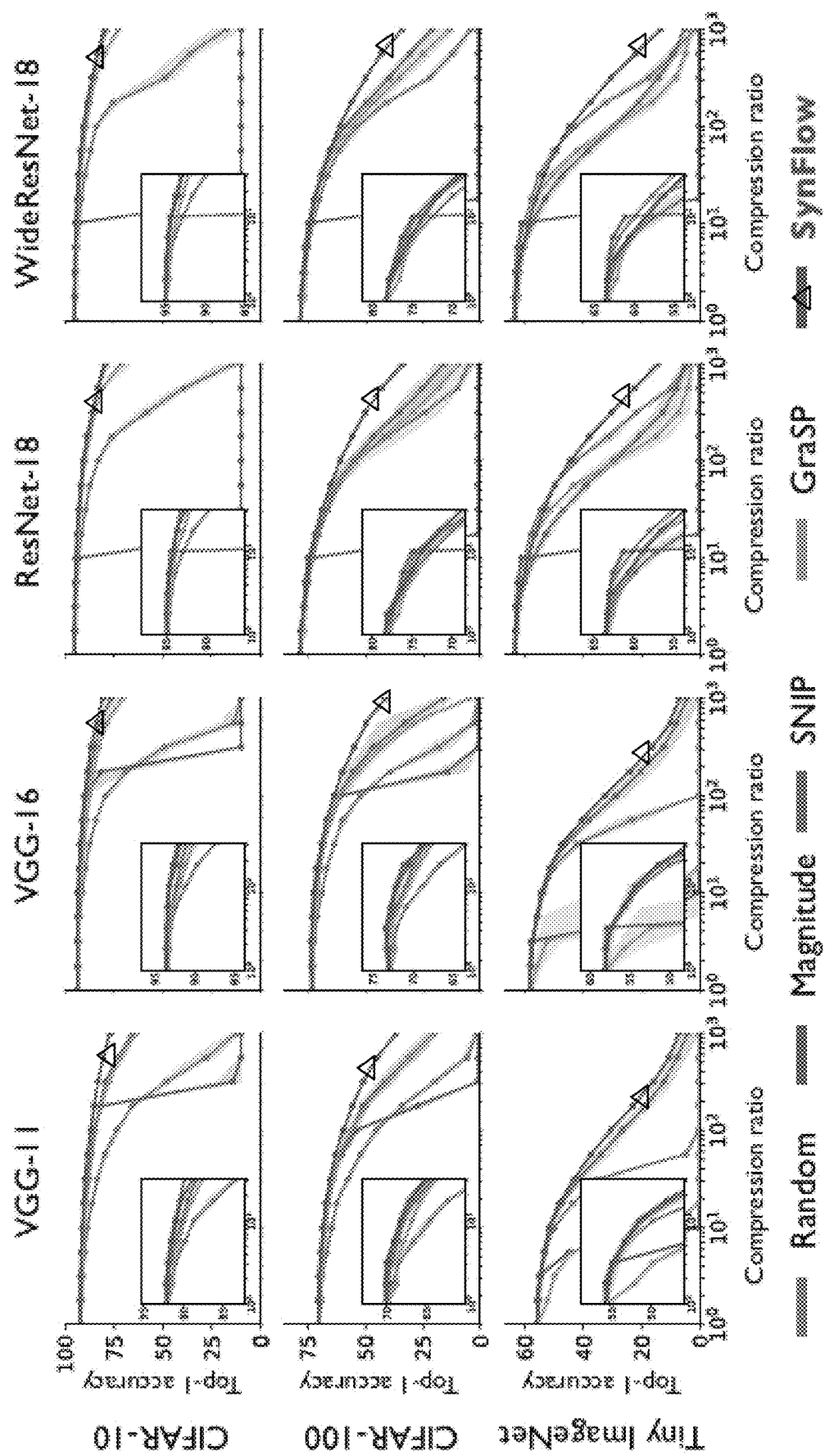
FIG. 11 illustrates top-1 test accuracy as a function of different compression ratios for known pruning methods and the SynFlow method over twelve different models and datasets.

The SynFlow method described above and its performance (shown by the red line with the triangle identifier in FIG. 11) may be empirically benchmarked against baseline random pruning and magnitude pruning as well as the state-of-the-art algorithms SNIP and GraSP (the other colored lines in FIG. 11). FIG. 11 illustrates top-1 test accuracy as a function of different compression ratios for known pruning methods and the SynFlow method over twelve different models and datasets. The five methods (including SynFlow) were tested on 12 distinct combinations of modern architectures (VGG-11, VGG-16, ResNet-18, WideResNet-18) and datasets (CIFAR-10, CIFAR-100, Tiny ImageNet) over an exponential sweep of compression ratios ($10^\alpha$ for $\alpha=[0, 0.25, \ldots, 2.75, 3]$). Appendix A contains more details and hyperparameters of the experiments results shown in FIG. 11. For the testing whose results are shown in FIG. 11, three runs were performed with the same hyperparameter conditions and different random seeds and the solid line represents the mean, the shaded region represents area between minimum and maximum performance of the three runs.

As shown in FIG. 11, the SynFlow method (whose results for each dataset and architecture are shown with a red line with the triangle identifier) consistently outperforms the other methods in the high compression regime ($10^{1.5}<\rho$) and demonstrates significantly more stability, as indicated by its tight intervals. Furthermore, SynFlow is the only pruning method that reliably shows better performance to the random pruning baseline since SNIP and GraSP perform significantly worse than random pruning with ResNet-18 and WideResNet-18 trained on Tiny ImageNet as shown in FIG. 11. In addition, the SynFlow method is also quite competitive in the low compression regime ($\rho<10^{1.5}$) as shown in the lefthand portion of each chart that is blown up inside of the box. Although magnitude pruning can partially outperform SynFlow in this low compression regime with models trained on Tiny ImageNet, it suffers from catastrophic layer-collapse as indicated by the sharp drops in accuracy shown in FIG. 11. While an exemplary number of iterations are discussed above, the number of iterations is user configurable, but as shown above 100 iterations achieves the goals of the Synflow method.

REFERENCES

[1] Michael C Mozer and Paul Smolensky. Skeletonization: A technique for trimming the fat from a network via relevance assessment. In Advances in neural information processing systems, pages 107-115, 1989.

[2] Yann LeCun, John S Denker, and Sara A Solla. Optimal brain damage. In Advances in neural information processing systems, pages 598-605, 1990.

[3] Babak Hassibi and David G Stork. Second order derivatives for network pruning: Optimal brain surgeon. In Advances in neural information processing systems, pages 164-171, 1993.

[4] Steven A Janowsky. Pruning versus clipping in neural networks. Physical Review A, 39(12):6600, 1989.

[5] Russell Reed. Pruning algorithms-a survey. IEEE transactions on Neural Networks, 4(5):740-747, 1993.

[6] Song Han, Jeff Pool, John Tran, and William Dally. Learning both weights and connections for efficient neural network. In Advances in neural information processing systems, pages 1135-1143, 2015.

[7] Vivienne Sze, Yu-Hsin Chen, Tien-Ju Yang, and Joel S Emer. Efficient processing of deep neural networks: A tutorial and survey. Proceedings of the IEEE, 105(12): 2295-2329, 2017.

[8] Sanjeev Arora, Rong Ge, Behnam Neyshabur, and Yi Zhang. Stronger generalization bounds for deep nets via a compression approach. In Jennifer Dy and Andreas Krause, editors, Proceedings of the 35th International Conference on Machine Learning, volume 80 of Proceedings of Machine Learning Research, pages 254-263. PMLR, 2018.

[9] Hidenori Tanaka, Aran Nayebi, Niru Maheswaranathan, Lane McIntosh, Stephen Baccus, and Surya Ganguli. From deep learning to mechanistic understanding in neuroscience: the structure of retinal prediction. In Advances in Neural Information Processing Systems, pages 8535-8545, 2019.

[10] Jonathan Frankle and Michael Carbin. The lottery ticket hypothesis: Finding sparse, trainable neural networks. In International Conference on Learning Representations, 2019.

[11] Jonathan Frankle, G Karolina Dziugaite, DM Roy, and M Carbin. Stabilizing the lottery ticket hypothesis. arXiv, page.

[12] Ari Morcos, Haonan Yu, Michela Paganini, and Yuandong Tian. One ticket to win them all: generalizing lottery ticket initializations across datasets and optimizers. In Advances in Neural Information Processing Systems, pages 4933-4943, 2019.

[13] Namhoon Lee, Thalaiyasingam Ajanthan, and Philip Torr. SNIP: SINGLE-SHOT NETWORK PRUNING BASED ON CONNECTION SENSITIVITY. In International Conference on Learning Representations, 2019.

[14] Chaoqi Wang, Guodong Zhang, and Roger Grosse. Picking winning tickets before training by preserving gradient flow. In International Conference on Learning Representations, 2020.

[15] Forrest N Iandola, Song Han, Matthew W Moskewicz, Khalid Ashraf, William J Dally, and Kurt Keutzer. Squeezenet: Alexnet-level accuracy with 50× fewer parameters and <0.5 mb model size. arXiv preprint arXiv: 1602.07360, 2016.

[16] Andrew G Howard, Menglong Zhu, Bo Chen, Dmitry Kalenichenko, Weijun Wang, Tobias Weyand, Marco Andreetto, and Hartwig Adam. Mobilenets: Efficient convolutional neural networks for mobile vision applications. arXiv preprint arXiv:1704.04861, 2017.

[17] Ameya Prabhu, Girish Varma, and Anoop Namboodiri. Deep expander networks: Efficient deep networks from graph theory. In Proceedings of the European Conference on Computer Vision (ECCV), pages 20-35, 2018.

[18] Max Jaderberg, Andrea Vedaldi, and Andrew Zisserman. Speeding up convolutional neural networks with low rank expansions. In Proceedings of the British Machine Vision Conference. BMVA Press, 2014. doi: http://dx.doi.org/10.5244/C.28.88.

[19] Alexander Novikov, Dmitrii Podoprikhin, Anton Osokin, and Dmitry P Vetrov. Tensorizing neural networks. In Advances in neural information processing systems, pages 442-450, 2015.

[20] Guillaume Bellec, David Kappel, Wolfgang Maass, and Robert Legenstein. Deep rewiring: Training very sparse deep networks. In International Conference on Learning Representations, 2018.

[21] Decebal Constantin Mocanu, Elena Mocanu, Peter Stone, Phuong H Nguyen, Madeleine Gibescu, and Antonio Liotta. Scalable training of artificial neural networks with adaptive sparse connectivity inspired by network science. Nature communications, 9(1):1-12, 2018.

[22] Trevor Gale, Erich Elsen, and Sara Hooker. The state of sparsity in deep neural networks. arXiv preprint arXiv:1902.09574, 2019.

[23] Davis Blalock, Jose Javier Gonzalez Ortiz, Jonathan Frankle, and John Guttag. What is the state of neural network pruning? arXiv preprint arXiv:2003.03033, 2020.

[24] Sejun Park*, Jaeho Lee*, Sangwoo Mo, and Jinwoo Shin. Lookahead: A far-sighted alternative of magnitude-based pruning. In International Conference on Learning Representations, 2020.

[25] Ehud D Karnin. A simple procedure for pruning back-propagation trained neural networks. IEEE transactions on neural networks, 1(2):239-242, 1990.

[26] Pavlo Molchanov, Stephen Tyree, Tero Karras, Timo Aila, and Jan Kautz. Pruning convolutional neural networks for resource efficient inference. arXiv preprint arXiv:1611.06440, 2016.

[27] Pavlo Molchanov, Arun Mallya, Stephen Tyree, Iuri Frosio, and Jan Kautz. Importance estimation for neural network pruning. In Proceedings of the IEEE Conference on Computer Vision and Pattern Recognition, pages 11264-11272, 2019.

[28] Yiwen Guo, Anbang Yao, and Yurong Chen. Dynamic network surgery for efficient dnns. In Advances in neural information processing systems, pages 1379-1387, 2016.

[29] Xin Dong, Shangyu Chen, and Sinno Pan. Learning to prune deep neural networks via layer-wise optimal brain surgeon. In Advances in Neural Information Processing Systems, pages 4857-4867, 2017.

[30] Ruichi Yu, Ang Li, Chun-Fu Chen, Jui-Hsin Lai, Vlad I Morariu, Xintong Han, Mingfei Gao, Ching-Yung Lin, and Larry S Davis. Nisp: Pruning networks using neuron importance score propagation. In Proceedings of the IEEE Conference on Computer Vision and Pattern Recognition, pages 9194-9203, 2018.

[31] Zhuang Liu, Mingjie Sun, Tinghui Zhou, Gao Huang, and Trevor Darrell. Rethinking the value of network pruning. In International Conference on Learning Representations, 2019.

[32] Namhoon Lee, Thalaiyasingam Ajanthan, Stephen Gould, and Philip H. S. Torr. A signal propagation perspective for pruning neural networks at initialization. In International Conference on Learning Representations, 2020.

[33] Haoran You, Chaojian Li, Pengfei Xu, Yonggan Fu, Yue Wang, Xiaohan Chen, Richard G. Baraniuk, Zhangyang Wang, and Yingyan Lin. Drawing early-bird tickets: Toward more efficient training of deep networks. In International Conference on Learning Representations, 2020.

[34] Wenyuan Zeng and Raquel Urtasun. Mlprune: Multi-layer pruning for automated neural network compression. 2018.

[35] Hesham Mostafa and Xin Wang. Parameter efficient training of deep convolutional neural networks by dynamic sparse reparameterization. In Proceedings of the 36th International Conference on Machine Learning, volume 97 of Proceedings of Machine Learning Research, pages 4646-4655. PMLR, 2019.

[36] Xavier Glorot and Yoshua Bengio. Understanding the difficulty of training deep feedforward neural networks. In Proceedings of the thirteenth international conference on artificial intelligence and statistics, pages 249-256, 2010.

[37] Kaiming He, Xiangyu Zhang, Shaoqing Ren, and Jian Sun. Deep residual learning for image recognition. In Proceedings of the IEEE conference on computer vision and pattern recognition, pages 770-778, 2016.

[38] Kedar Dhamdhere, Mukund Sundararajan, and Qiqi Yan. How important is a neuron. In International Conference on Learning Representations, 2019.

[39] Sebastian Bach, Alexander Binder, Grégoire Montavon, Frederick Klauschen, Klaus-Robert Müller, and Wojciech Samek. On pixel-wise explanations for non-linear classifier decisions by layer-wise relevance propagation. PloS one, 10(7), 2015.

[40] Seul-Ki Yeom, Philipp Seegerer, Sebastian Lapuschkin, Simon Wiedemann, Klaus-Robert Müller, and Wojciech Samek. Pruning by explaining: A novel criterion for deep neural network pruning. arXiv preprint arXiv:1912.08881, 2019.

[41] Hattie Zhou, Janice Lan, Rosanne Liu, and Jason Yosinski. Deconstructing lottery tickets: Zeros, signs, and the supermask. In Advances in Neural Information Processing Systems, pages 3592-3602, 2019.

[42] Haoran You, Chaojian Li, Pengfei Xu, Yonggan Fu, Yue Wang, Xiaohan Chen, Richard G. Baraniuk, Zhangyang Wang, and Yingyan Lin. Drawing early-bird tickets: Toward more efficient training of deep networks. In International Conference on Learning Representations, 2020.

[43] Jonathan Frankle, Gintare Karolina Dziugaite, Daniel M Roy, and Michael Carbin. Linear mode connectivity and the lottery ticket hypothesis. arXiv preprint arXiv:1912.05671, 2019.

[44] Haonan Yu, Sergey Edunov, Yuandong Tian, and Ari S. Morcos. Playing the lottery with rewards and multiple languages: lottery tickets in rl and nlp. In International Conference on Learning Representations, 2020.

[45] Simon S Du, Wei Hu, and Jason D Lee. Algorithmic regularization in learning deep homogeneous models: Layers are automatically balanced. In Advances in Neural Information Processing Systems, pages 384-395, 2018.

[46] Stijn Verdenius, Maarten Stol, and Patrick Forré. Pruning via iterative ranking of sensitivity statistics. arXiv preprint arXiv:2006.00896, 2020.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations.

Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc.

Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An apparatus, comprising:
   a computer system having an application specific integrated circuit (ASIC) and memory and a plurality of lines of instructions executed by the ASIC to perform operations comprising:
     receive an untrained initial neural network having one or more layers with an input layer, an output layer and one or more layers between the input layer and the output layer in which each layer has a plurality of neurons with each neuron having a parameter, a particular neuron in each layer having a synapse that connects to another particular neuron in a different layer of the initial neural network;
     initialize a binary mask that prunes one or more neurons in the initial neural network; and
     perform iterative synaptic flow pruning to generate a sparse trainable subnetwork with a predetermined level of compression and no layer collapse.

2. The apparatus of claim 1, wherein the ASIC is further configured to generate a score for each parameter, prune any neuron of the initial neural network whose score does not meet a threshold to generate an updated mask and iteratively generate the score and pruning the one or more neurons until a predetermined number of iterations has been completed.

3. The apparatus of claim 2, wherein the ASIC is further configured to generate a synaptic saliency score.

4. The apparatus of claim 3, wherein the ASIC is further configured to generate a positive synaptic saliency score.

5. A method, comprising:
   receiving, by an application specific integrated circuit (ASIC), an untrained initial neural network having one or more layers with an input layer, an output layer and one or more layers between the input layer and the output layer in which each layer has a plurality of neurons with each neuron having a parameter, a particular neuron in each layer having a synapse that connects to another particular neuron in a different layer of the initial neural network;
   initializing, by the ASIC, a binary mask that prunes one or more neurons in the initial neural network; and
   performing, by the ASIC, iterative synaptic flow pruning to generate a sparse trainable subnetwork with a predetermined level of compression and no layer collapse.

6. The method of claim 5, wherein performing the iterative synaptic flow pruning further comprises:
   generating, by the ASIC, a score for each parameter;
   pruning, by the ASIC, any neuron of the initial neural network whose score does not meet a threshold to generate an updated mask; and
   iteratively generating, by the ASIC, the score and pruning the one or more neurons until a predetermined number of iterations has been completed.

7. The method of claim 6, wherein the generating the score further comprises generating, by the ASIC, a synaptic saliency score.

8. The method of claim 7, wherein the generating the score further comprises generating, by the ASIC, a positive synaptic saliency score.

9. An apparatus, comprising:
   a computer system having an application specific integrated circuit (ASIC) and memory and a plurality of lines of instructions executed by the ASIC to perform operations comprising:
     receive an untrained initial neural network having one or more layers with an input layer, an output layer and one or more layers between the input layer and the output layer in which each layer has a plurality of neurons with each neuron having a parameter, a particular neuron in each layer having a synapse that connects to another particular neuron in a different layer of the initial neural network;
     generate a sparse trainable subnetwork with a predetermined level of compression and no layer collapse using iterative synaptic pruning; and
     use the sparse trainable subnetwork for data processing.

10. The apparatus of claim 9, wherein the ASIC is further configured to generate a score for each parameter, prune any neuron of the initial neural network whose score does not meet a threshold to generate an updated mask and iteratively generate the score and pruning the neurons until a predetermined number of iterations has been completed to generate the sparse trainable subnetwork.

11. The apparatus of claim 10, wherein the ASIC is further configured to generate a synaptic saliency score.

12. The apparatus of claim 11, wherein the ASIC is further configured to generate a positive synaptic saliency score.

13. A method, comprising:

receiving, by an application specific integrated circuit (ASIC), an untrained initial neural network having one or more layers with an input layer, an output layer and one or more layers between the input layer and the output layer in which each layer has a plurality of neurons with each neuron having a parameter, a particular neuron in each layer having a synapse that connects to another particular neuron in a different layer of the initial neural network;

generating, by the ASIC, a sparse trainable subnetwork with a predetermined level of compression and no layer collapse using iterative synaptic pruning; and using, by the ASIC, the sparse trainable subnetwork for data processing.

14. The method of claim 13, wherein generating the sparse trainable subnetwork further comprises:

generating, by the ASIC, a score for each parameter;

pruning, by the ASIC, any neuron of the initial neural network whose score does not meet a threshold to generate an updated mask; and iteratively generating, by the ASIC, the score and pruning the neurons until a predetermined number of iterations has been completed.

15. The method of claim 14, wherein the generating the score further comprises generating, by the ASIC, a synaptic saliency score.

16. The method of claim 15, wherein the generating the score further comprises generating, by the ASIC, a positive synaptic saliency score.

* * * * *